United States Patent [19]
Jeppson

[11] Patent Number: 6,122,131
[45] Date of Patent: Sep. 19, 2000

[54] ADAPTIVELY-CONTROLLED DISK DRIVE ASSEMBLY

[75] Inventor: David B. Jeppson, San Jose, Calif.

[73] Assignee: Quantum Corporation, Milpitas, Calif.

[21] Appl. No.: 08/928,214

[22] Filed: Sep. 12, 1997

[51] Int. Cl.[7] .................. G11B 5/596; G11B 5/39
[52] U.S. Cl. .................. 360/77.02; 360/77.08; 360/313
[58] Field of Search .................. 360/113, 77.02, 360/55, 77.05, 77.08, 313

[56] References Cited

U.S. PATENT DOCUMENTS

| | | | |
|---|---|---|---|
| 4,924,160 | 5/1990 | Tung . | |
| 5,793,240 | 8/1998 | Kuwano et al. | 327/310 |
| 5,808,825 | 9/1998 | Okamura | 360/75 |
| 5,818,656 | 10/1998 | Klaassen et al. | 360/67 |
| 5,872,676 | 2/1999 | Smith et al. | 360/77.03 |
| 5,880,901 | 3/1999 | Smith et al. | 360/75 |
| 5,898,532 | 4/1999 | Du et al. | 360/46 |
| 5,898,535 | 4/1999 | Kawai | 360/77.02 |
| 5,901,001 | 5/1999 | Meyer et al. | 360/25 |
| 5,917,670 | 6/1999 | Scaramazzu et al. | 360/53 |
| 5,917,672 | 6/1999 | Pham et al. | 360/78.09 |
| 5,956,197 | 9/1999 | Le et al. | 360/67 |
| 5,956,201 | 9/1999 | Pham et al. | 360/78.09 |

*Primary Examiner*—William Klimowicz
*Attorney, Agent, or Firm*—Michael Zarrabian

[57] ABSTRACT

A disk drive assembly including circuitry for adaptively selecting performance characteristics of the assembly. The performance characteristics are adaptively selected responsive to a balancing of maximizing performance of the assembly while also minimizing occurrences of misoperation. A disk drive assembly of improved characteristics and error correcting capabilities is provided.

34 Claims, 21 Drawing Sheets

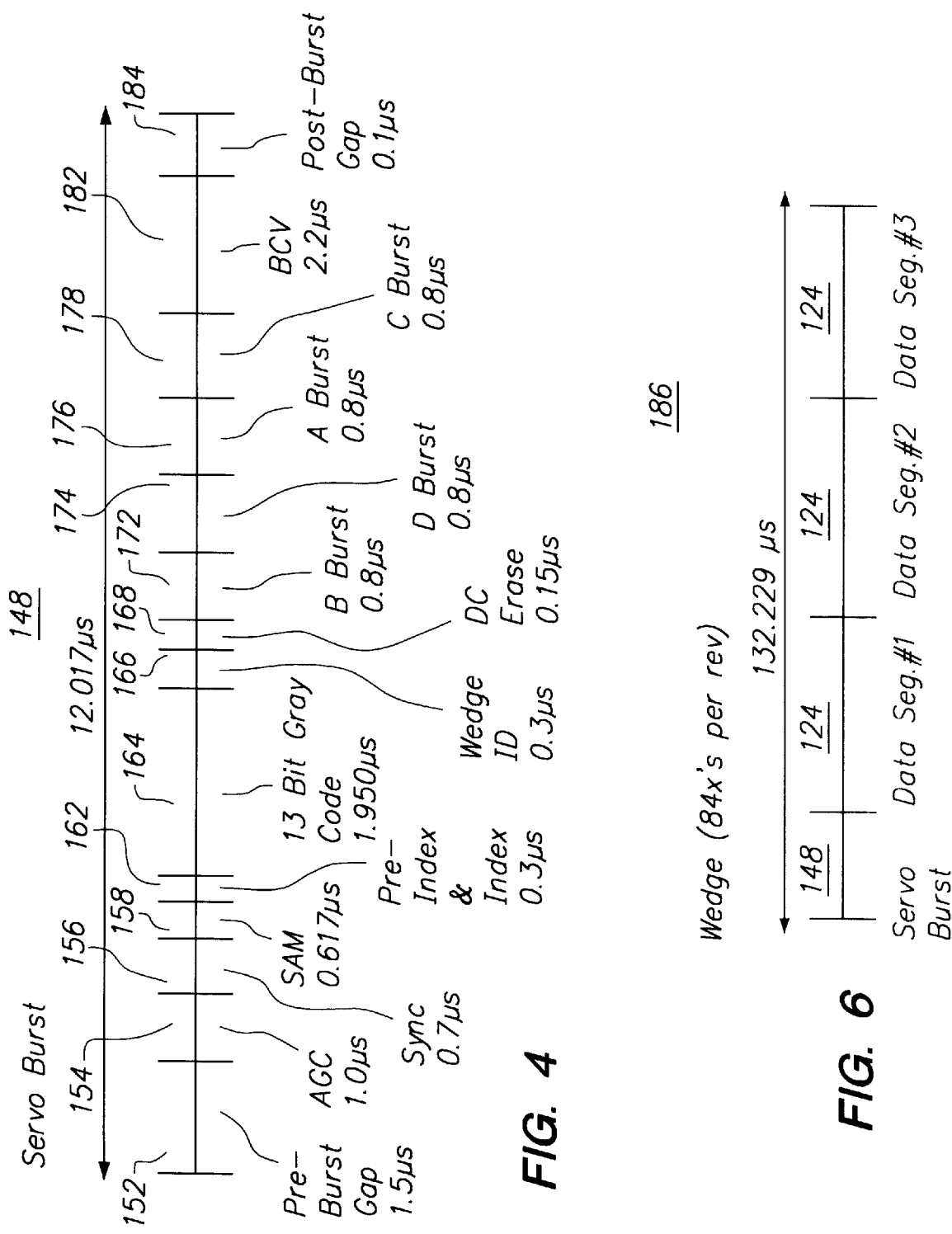

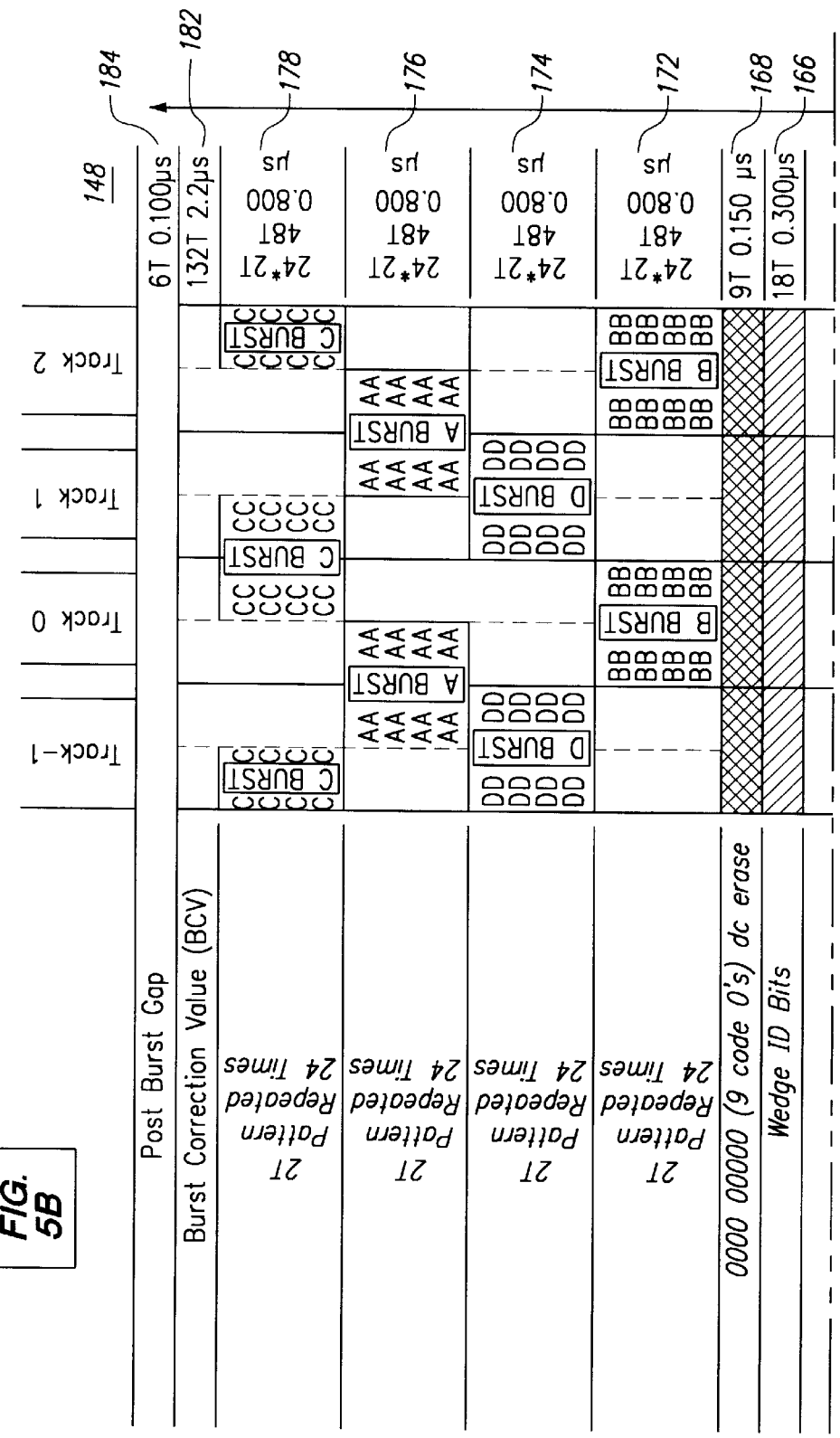

ADAPTIVELY-CONTROLLED DISK DRIVE ASSEMBLY

The present invention relates generally to computer, mass-storage of data. More particularly, the present invention relates to a disk drive assembly, and an associated method, which exhibits performance characteristics which can be adaptively controlled.

BACKGROUND OF THE INVENTION

A disk drive assembly is a computer, mass-storage device from which data may be read and/or to which such data may be written. Typically, a disk drive assembly includes one or more randomly-accessible rotatable storage media, or disks, upon which the data is encoded by various means. In a magnetic disk drive, the data is encoded thereon as bits of information comprising magnetic field reversals grouped in tracks on the magnetically-hard surface of the rotating disk or disks. When the disk drive assembly includes a plurality of disks, the disks are typically stacked in a generally parallel and spaced-relationship and affixed at their inner diameters to a common hub.

A spindle motor imparts rotational forces to rotate the rotatable storage media at a rotational speed. A magneto resistive (MR), or other, head transducer is positionable proximate to the rotating storage media to read the data from the magnetic media forming the storage media. The MR head transducer detects magnetic field signal changes from magnetic media. Such detection is made due to changes in the resistance of the MR head transducer responsive to changes in the direction and amount of magnetic flux being sensed by the transducer.

The MR head transducer is supported by an actuator arm. Movement is imparted to the actuator arm, and, hence, to the MR head transducer by appropriate actuation of a voice coil motor (VCM) of an actuator assembly. Successive read and write operations can be selectively performed by suitably positioning and repositioning the MR head transducer and associated inductive write transducer proximate to selected locations of the storage media.

Advancements in technology have permitted the development and implementation of successive generations of disk drive assemblies of ever-improving performance characteristics and memory capacities, of ever-smaller physical sizes, and at ever-lesser costs.

Several problems inherent of a disk drive assembly become increasingly problematical, however, when attempts are made to provide a disk drive assembly of such improved performance, increased memory capacity, smaller size, and lower cost.

For instance, when the disk drive assembly is to be operated at increased read and write rates, the disk drive assembly becomes more susceptible to misoperation due to the occurrence of an offtrack condition. An offtrack condition occurs when the actuator arm and the MR head transducer overshoot the intended location of the rotating storage media at which a read or write operation is to be performed responsive to actuation of the VCM. An offtrack condition might also occur if an external shock force is applied to the disk drive. Such conditions are sometimes referred to as "bumps". Increased velocities, for instance, at which the VCM moves the actuator arm increases the incidences of offtrack conditions. Also, the quality of the mounting by which the disk drive assembly is mounted in position also affects the incidence of offtrack conditions. A mounting of lesser quality, such as that might be precipitated through the use of an inexpensive mounting, might precipitate an increased incidence of bumps.

Manufacturability problems associated with the manufacture of disk drive assemblies also affects disk drive performance. For instance, tolerances associated with the manufacture of MR head transducers introduces variability in disk drive assembly performance. MR head transducers are also susceptible to electro-migration which adversely affects the longevity of the transducers. In the design and construction of a disk drive assembly, consideration must, therefore, be given to such manufacturability problems and problems associated with electro-migration.

Manufacturability problems are also associated with airlocks which form portions of disk drive assemblies. An airlock is a safety interlock. The airlock is operable to ensure that the rotatable storage media is rotating prior to movement of the MR head transducer thereupon. Tolerances associated with the manufacturer of airlocks introduces variability in disk drive performance as different airlocks open at different rotational speeds of the storage media. And, a single airlock may be operable to open at different rotational speeds responsive to changes in the ambient conditions, such as, e.g., the altitude at which the disk drive assembly is positioned.

Thermal asperities and stiction are also problems which can adversely affect performance of a disk drive assembly. Consideration must also be given to such problems when constructing a disk drive assembly.

Therefore, when designing and manufacturing disk drive assemblies with the goal of providing a disk drive assembly of improved performance and increased memory capacity, consideration must be given to the aforementioned problems.

What is needed is a disk drive assembly of improved performance, increased memory capacity, and reduced cost which reduces the aforementioned problems associated with disk drive assemblies.

It is in light of this background information related to disk drive assemblies that the significant improvements of the present invention have evolved.

SUMMARY OF THE INVENTION

The present invention advantageously provides a disk drive assembly, and an associated method therefor, of improved performance characteristics and increased memory capacity, provided at an economical cost.

The disk drive assembly has adaptively selectable performance characteristics selectable during its operation. The performance characteristics are selected to balance the desire to maximize the performance characteristics with the need to minimize misoperation of the disk drive assembly. For example, the speed at which read and write operations are performed are balanced with the risk that, at higher speeds, misoperation of the disk drive assembly is more likely to occur.

The disk drive assembly is also operable in manners which reduce the deleterious affects inherent in disk drive assembly apparatus. For instance, the disk drive assembly is constructed to reduce the problems associated with electro-migration of an MR head transducer, thermal asperities, stiction, and manufacturing variances of an MR head transducer. Problems associated with manufacturing variances of airlocks are also reduced through operation of an embodiment of the disk drive assembly of the present invention.

In these and other aspects, therefore, a disk drive assembly, and an associated method therefor, is provided.

The disk drive assembly is mountable at a supportive mounting of a host device. Rotatable storage media has servo information locations and data storage locations arranged thereupon. A spindle motor has a spindle rotatable about a longitudinal axis. The spindle is engaged with the rotatable storage media wherein the spindle motor induces rotational forces for rotating the rotatable storage media at a selected rotation speed. An MR (magneto resistive) head transducer is positionable proximate to the rotatable storage media. The head, selectively, with its MR transducer reads data stored upon, and with its associated inductive write transducer writes data upon, the rotatable storage media. A VCM (voice coil motor) is coupled to the MR head transducer. The voice coil motor positions the MR head transducer proximate to selected locations of the rotatable storage media. A read channel circuit is coupled to the MR head transducer. The read channel circuit processes the data read by the MR head transducer. Processing performed by the read channel circuit includes adaptive detection of thermal asperities formed upon the rotatable storage media. A controller is coupled to the spindle motor, the voice coil motor, and the read channel circuitry.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

FIG. 4 illustrates a logical block diagram of a servo burst, exemplary of a servo burst stored upon the data storage disk shown in FIG. 2.

FIG. 6 illustrates in greater detail an embedded servo sector corresponding to the servo burst shown in FIG. 4.

DETAILED DESCRIPTION

Figure 1A:
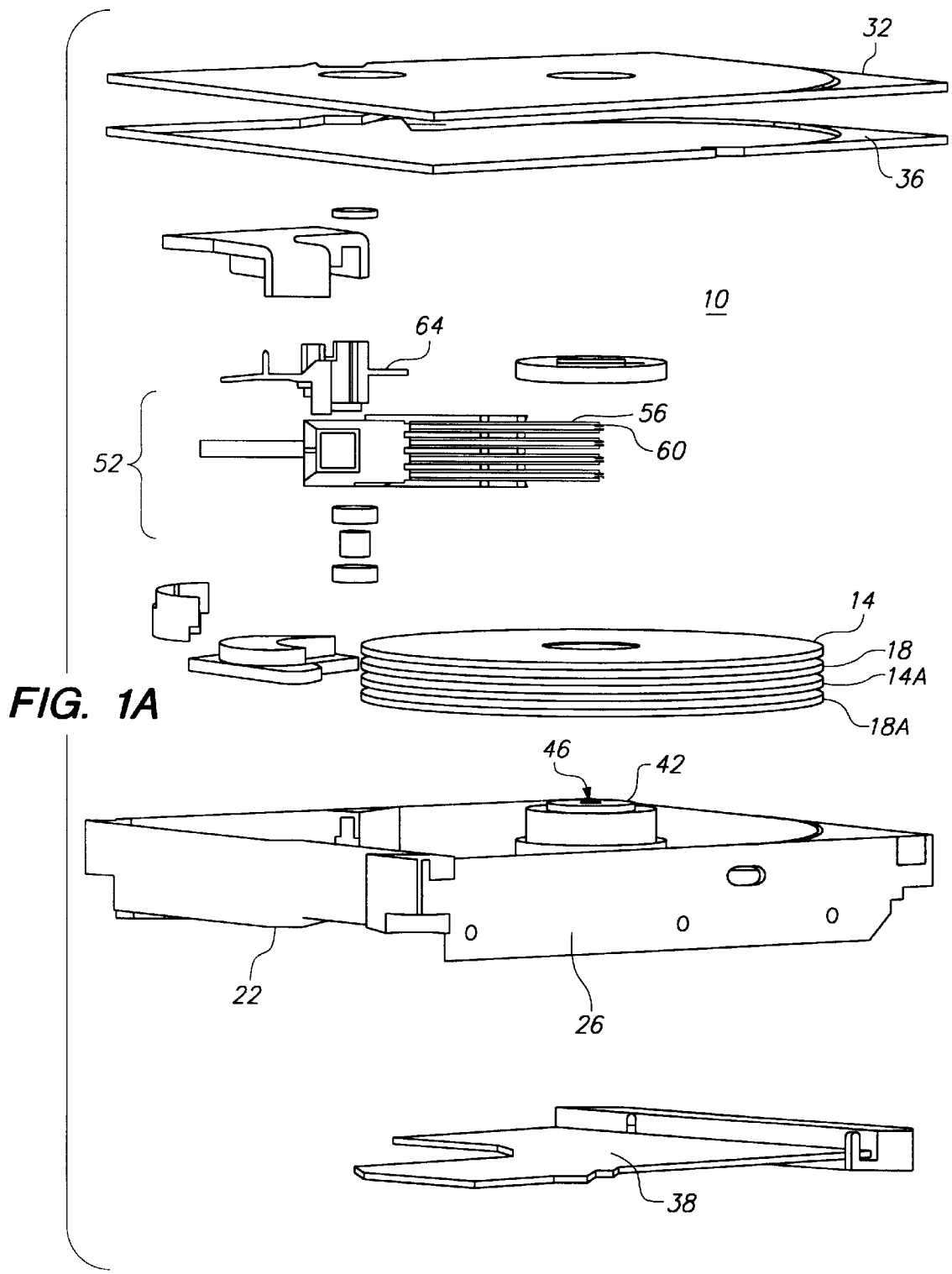
FIGS. 1A–C illustrate an exploded, top plan, and bottom plan view of a disk drive assembly of an embodiment of the present invention.
Figure 1B:
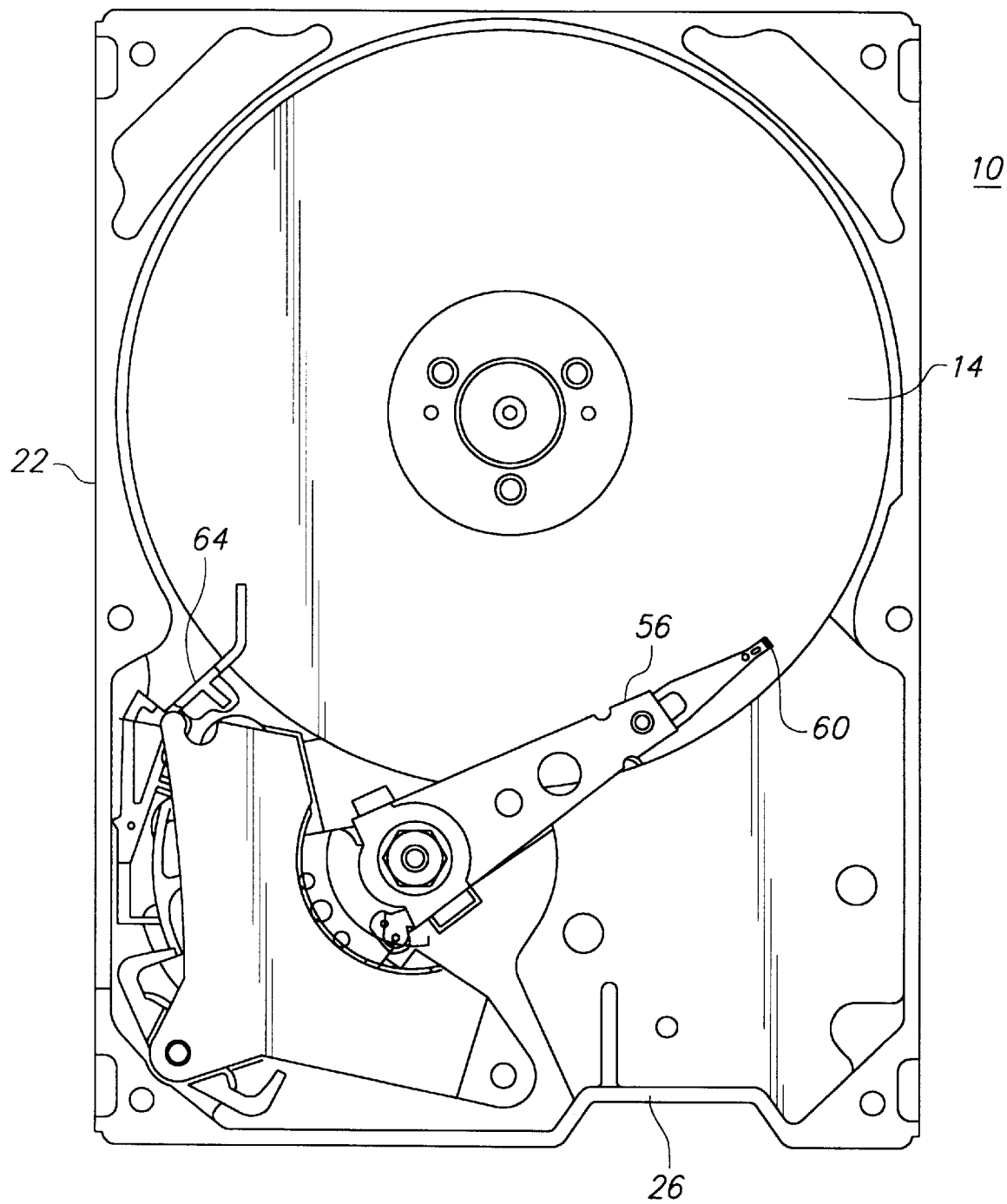
Figure 1C:
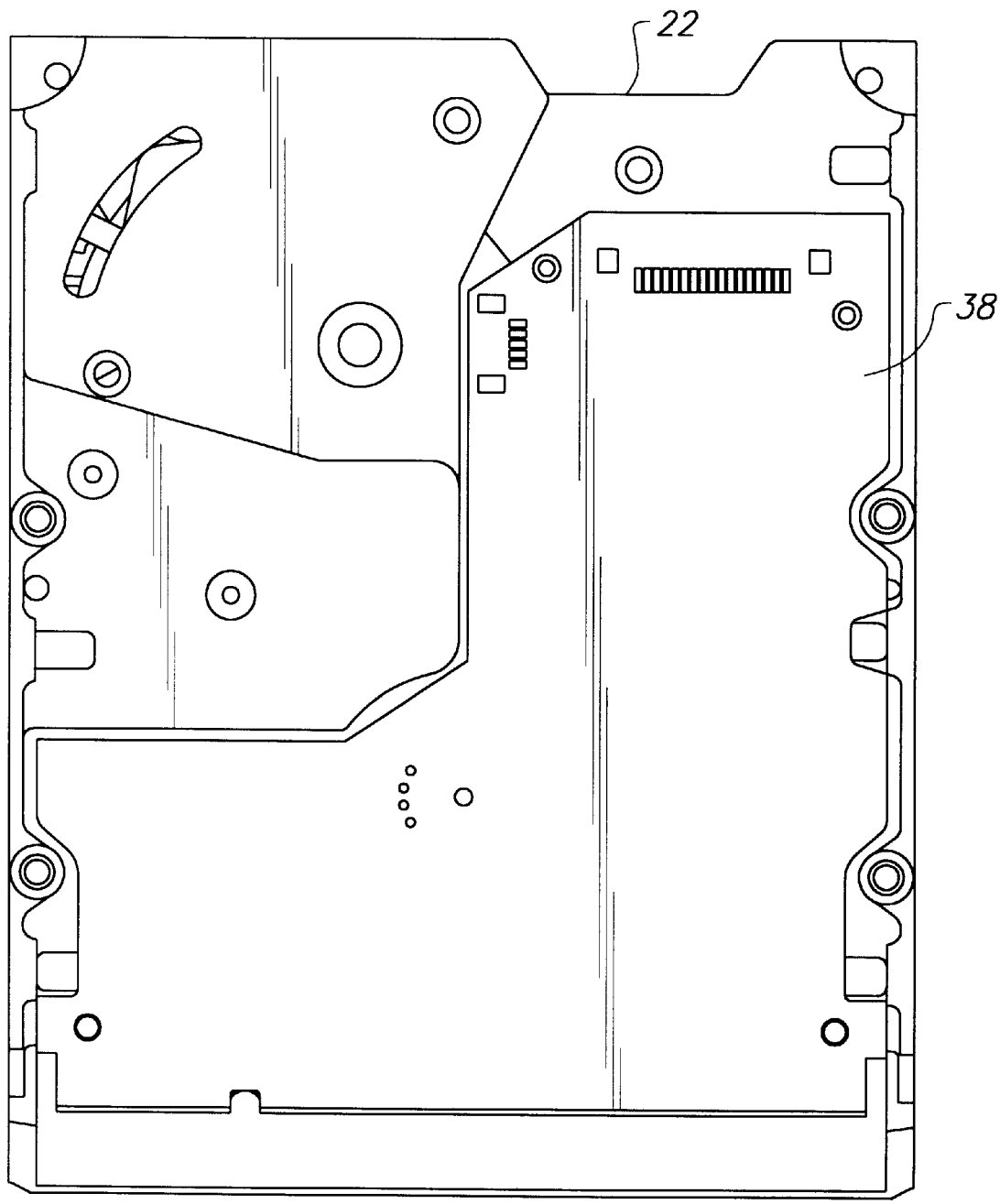

Referring first to FIGS. 1A–C, an exemplary disk drive assembly, shown generally at 10, of an embodiment of the present invention is shown. The exemplary assembly 10 shown in the Figure forms a two-disk drive assembly having two data disks 14 and 18, each having top and bottom data surfaces and two nondata disks 19 and 21. In other embodiments, other exemplary disk drive assemblies include greater, or fewer, numbers of data disks. In the exemplary embodiment having two data disks 14 and 18, the storage capacity of the assembly 10 is of approximately 3.2 GB. Other embodiments including later or fewer numbers of data disks have correspondingly greater or fewer storage capacities.

The data disks are supported within an assembly housing. The housing is here shown to include a housing base 22 having a continuous peripheral sidewall 26 extending thereabout and a cover 32. The housing base 22, sidewall 26, and cover 32 together supportively enclose the data disks 14 and 18. A gasket 36 is positioned between the cover 32 and housing base 22 for forming a sealed-enclosure.

Circuitry of the disk drive assembly, including the control circuitry thereof, is mounted upon a printed circuit board 38 which is mounted upon a bottom (as shown) surface of the housing base 22.

The data disks 14 and 18, at inner hub portions thereof, are engaged with a spindle 42 of a spindle motor assembly 46. As shall be described in greater detail below, the spindle motor assembly 46 is operable to impart rotational forces to the data disks 14 and 18 to cause rotation of the data disks at selected rotational speeds.

A mass-balanced, rotary actuator assembly 52 includes permanent magnets and wedge-shaped coils (not shown) and actuator arms 56 capable of extending over respective top and bottom face surfaces of the data disks 14 and 18, respectively. MR transducer heads 60 are positioned proximate to end portions of the actuator arms to be moved together with movement of the actuator arms 56. Movement induced to actuator arms 56 positions the transducer heads 60 proximate to selected locations above or beneath, respectively, the storage surfaces disposed upon the data disks 14 and 18, respectively.

An airlock 64, forming a safety interlock, is positioned in a closed position to prevent movement of the actuator arm 56 until the data disks 14 and 18 are rotating at rotational speeds great enough to open the airlocks 64. When wind forces generated responsive to rotation of the data disks 14 and 18 are great enough to ensure proper spacing between the respective disks and the corresponding transducer heads 60 during their "flying", i.e., movement, across the face surfaces of the data disks, the airlock opens.

Figure 2:
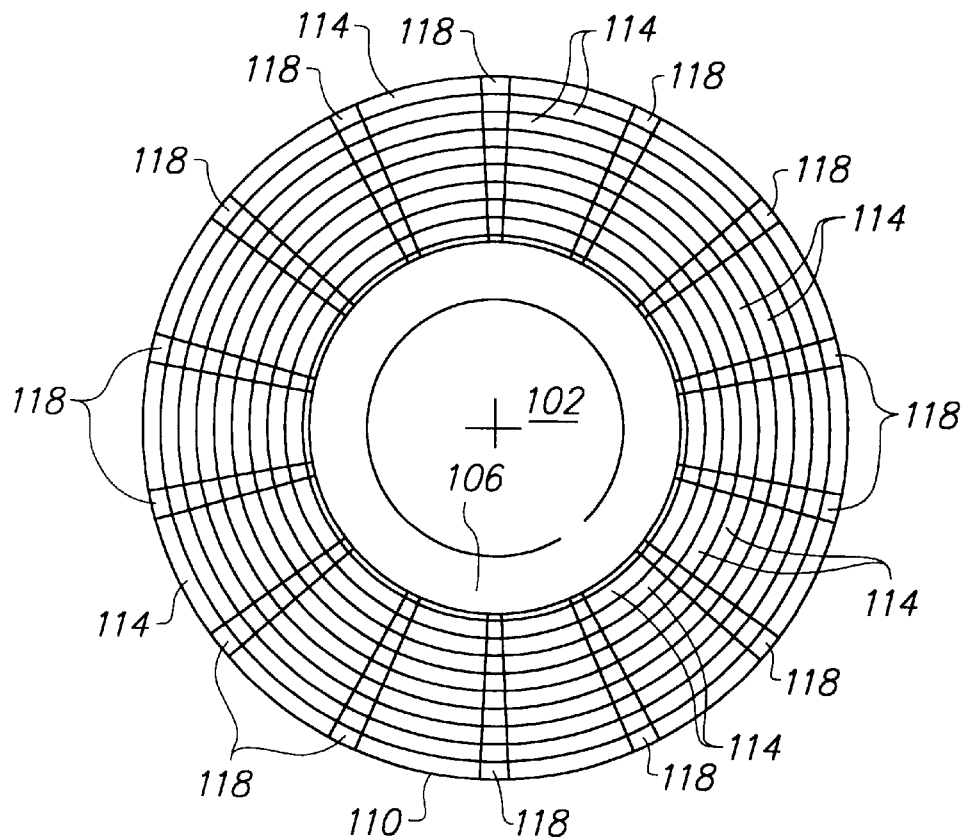
FIG. 2 illustrates functionally a plan view a data storage disk which forms a portion of the disk drive assembly shown in FIG. 1.

FIG. 2 illustrates the data disk 14 in greater detail. The data disk 14 of the exemplary embodiment is of a radius of 1.870 inches and is formed of a suitably flat and smooth substrate material, such as aluminum, metal or glass coated with, e.g., a magnetic storage medium, such as a high oerstead thin film magnetic storage medium, vacuum sputter deposited onto the substrate. The data disk 18 can be similarly represented.

The data disk 14 defines a central opening 102 to enable a disk clamp (not shown) to clamp the data disk 14 to a rotating spindle 42 (shown in FIG. 1).

Areas defined upon the data disk 14 include an inner landing zone area 106, an outer crash stop zone 110, and a plurality of recording zones, here seventeen recording zones, 114, each formed of a plurality of data tracks.

A plurality of servo sectors 118 are also defined upon the disk 14. As the data disk 14 is rotated by the spindle of the spindle assembly 46 (shown in FIG. 1), a head transducer 60 (also shown in FIG. 1) positioned proximate to storage locations of tracks of the recording zones 114 can read and/or write data from and/or to such storage locations.

Figure 3:
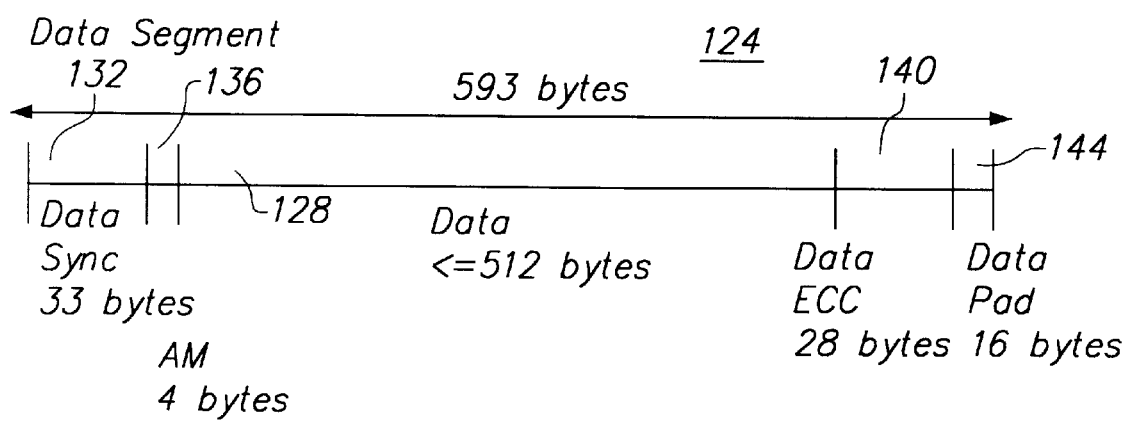
FIG. 3 illustrates the logical configuration of a data track segment of the data storage disk shown in FIG. 2.

FIG. 3 illustrates the logical configuration of a data track segment, shown generally at 124. The data track segment 124 forms a segmental portion of a data track of one of the recording zones 114 shown in FIG. 2. As illustrated, the data track segment is of a length of up to 593 bytes of which up to 512 bytes thereof are formed of data. The data is stored in a data portion 128 of the data track segment. The data track segment also includes a leading, data sync portion 132 of a 33-byte length, followed by an AM portion 136 of a more or less 3-byte length. A trailing portion of the data track segment 124 includes a data ECC portion 140 of a 28-byte length, formed a selected pattern of bits. And, a data pad portion 144 of a 16-byte length terminates the data track segment.

FIG. 4 illustrates a servo burst, here shown generally at 148, which comprises, for example, portions of a servo segment 118 (shown in FIG. 2). When the disk, such as the data disk 14 on which the servo burst is stored, is rotated at a nominal rotational speed, the servo burst is of a time length of 12.017 microseconds. The servo burst includes a preburst gap 152 of a 1.5 microsecond time length, followed by an AGC portion 154 of a 1 microsecond time length, and a sync portion 156 of a 0.7 microsecond time length. The sync portion 156 is followed by a SAM portion 158 of a 0.617 microsecond time length, and, then, by a pre-index and index portion 162 of a 0.3 microsecond time length.

The servo burst further includes a 13-bit Gray code 164 of a time length of 1.950 microseconds followed by wedge ID bits 166 of a 0.3 microsecond time length. The wedge ID bits are followed by a DC erase portion 168 of a time length of 0.15 microseconds and, then, by a B burst 172 of a time length of 0.8 microseconds. The B burst 172 is followed by a D burst portion 174, also of a 0.8 microsecond time length, and A burst 176, and a C burst 178, both of time lengths of 0.8 microseconds. A burst correction value (BCV) 182 follows the C burst 178 and is of a time length of 2.2 microseconds. And, a post-burst gap portion 184 of a time length of 0.1 microseconds.

Figure 5B:
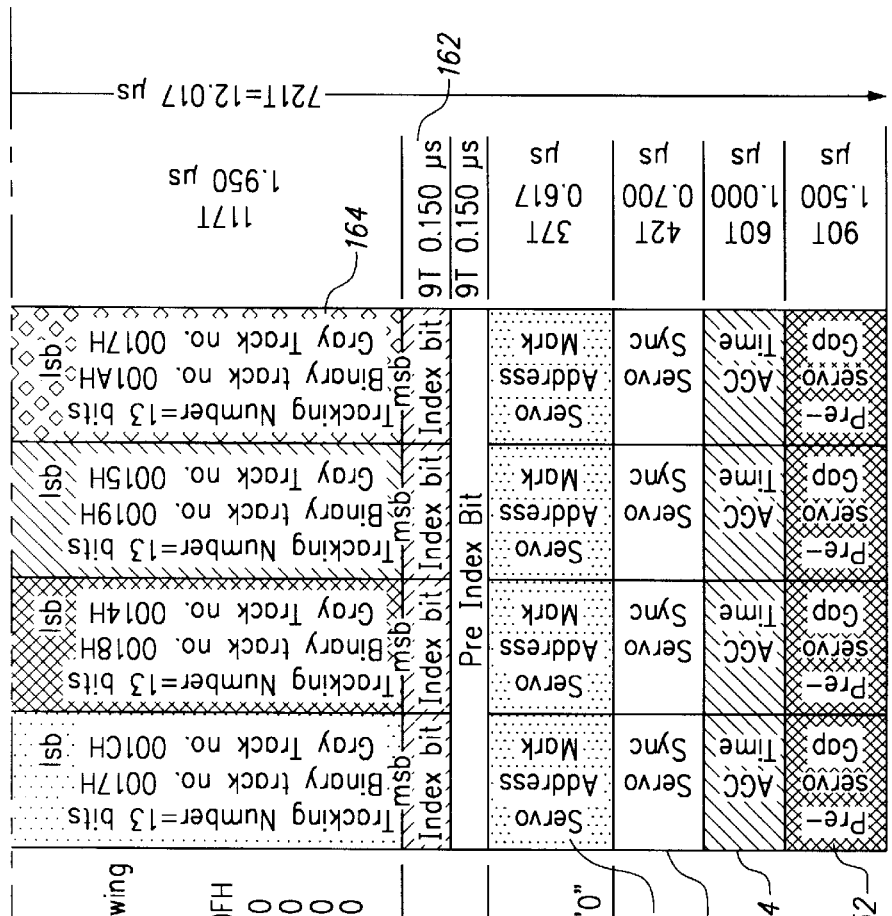
FIG. 5 illustrates the servo wedge format of a servo wedge forming a portion of the data storage disk shown in FIG. 2.

FIG. 5 again illustrates the servo burst 148. Each servo burst 148 consists of five separate fields. Using the nomenclature of FIG. 4, the fields include the AGC/sync field 154–156, the SAM (servo address mark) field 158, the track number 164, the burst area 172–178, and a BCV (burst correction value) field 182.

As, during operation of the disk drive assembly 10, a phase lock loop (PLL) is not used in a servo wedge area, time discrimination is instead utilized. Timing for all four of the fields is generated from a common crystal reference having a clock of 16.6 nanoseconds, referred to as T. Data is encoded such that a servo data bit "0" equals 10 000 010 0, and the servo data bit "1" equals 10 010 000 0. Each digit is of a T width, and the length of each servo data bit is 9T.

The AGC/sync field 154–156 consists of a default to T (or optionally, 3T) and is used by a read/write channel to inquire the proper amplitude for the encoded track number and position bursts. The field 154–156 is also used to synchronize raw data pulses in order to detect SAMs. The total length of the field 154–156 is 102T (60T+42T).

The SAM field 158 follows the servo sync field 156. The field 158 includes a default 14T, repeated twice, followed by a servo data bit 0. A pre-index bit follows the servo data bit 0, thereafter followed either by a servo data bit 0 or 1, also referred to as an index bit. If a one is decoded, then an index pulse is generated. The total length of the SAM field 158 is 37T. Following the index bit 162 is the track number 164. The track number is a 13-bit Gray-coded number. The Gray code-to-binary conversion is performed in, for example, a servo controller module of a disk controller and host interface ASIC; such structure shall be described below with respect to FIG. 7. Each Gray code bit is encoded as servo data bits. The total length of the track number is 117T. Sector number bits for ID-less less follow. Only the two least significant bits of the wedge number are written thereat.

A burst area 172–178 follows the track number 164. As illustrated, there are four bursts per servo wedge time. Namely, B burst 172 is followed by a D burst 174, followed by an A burst 176, and then a C burst 178. When on track, the A and C bursts 176 and 178 are equal at half amplitude, with the B burst 172 at full amplitude for even tracks, and zero amplitude for odd tracks. And, the D burst is at full amplitude for odd tracks and zero amplitude for even tracks.

The A–D bursts 172–178 are each 48T in length. A DC erase area 168 is positioned between the track number 164 field and burst field 172–178. The burst area is of a total time of 201T.

The BCV field 182 follows the burst field 172–178. BCV values of the BCV field 182 correct for small errors in the AC servo burst pairs. Space required for the BCV field 182 is of a length of 125T.

Detected errors in the servo wedge, such as missing syncs, missing SAMs, error reading Gray code, and speed error are detected during operation of the disk drive assembly 10.

FIG. 6 illustrates the format of a servo wedge, shown generally at 186. The servo wedge 186 is of a time length of 132.229 microseconds. Here, the servo wedge 186 is shown to be formed of a servo burst 148, similar to the servo burst shown in FIG. 4, and three sequentially positioned data segments 124, similar to the correspondingly-numbered data segment 124 shown in FIG. 3.

Figure 7:
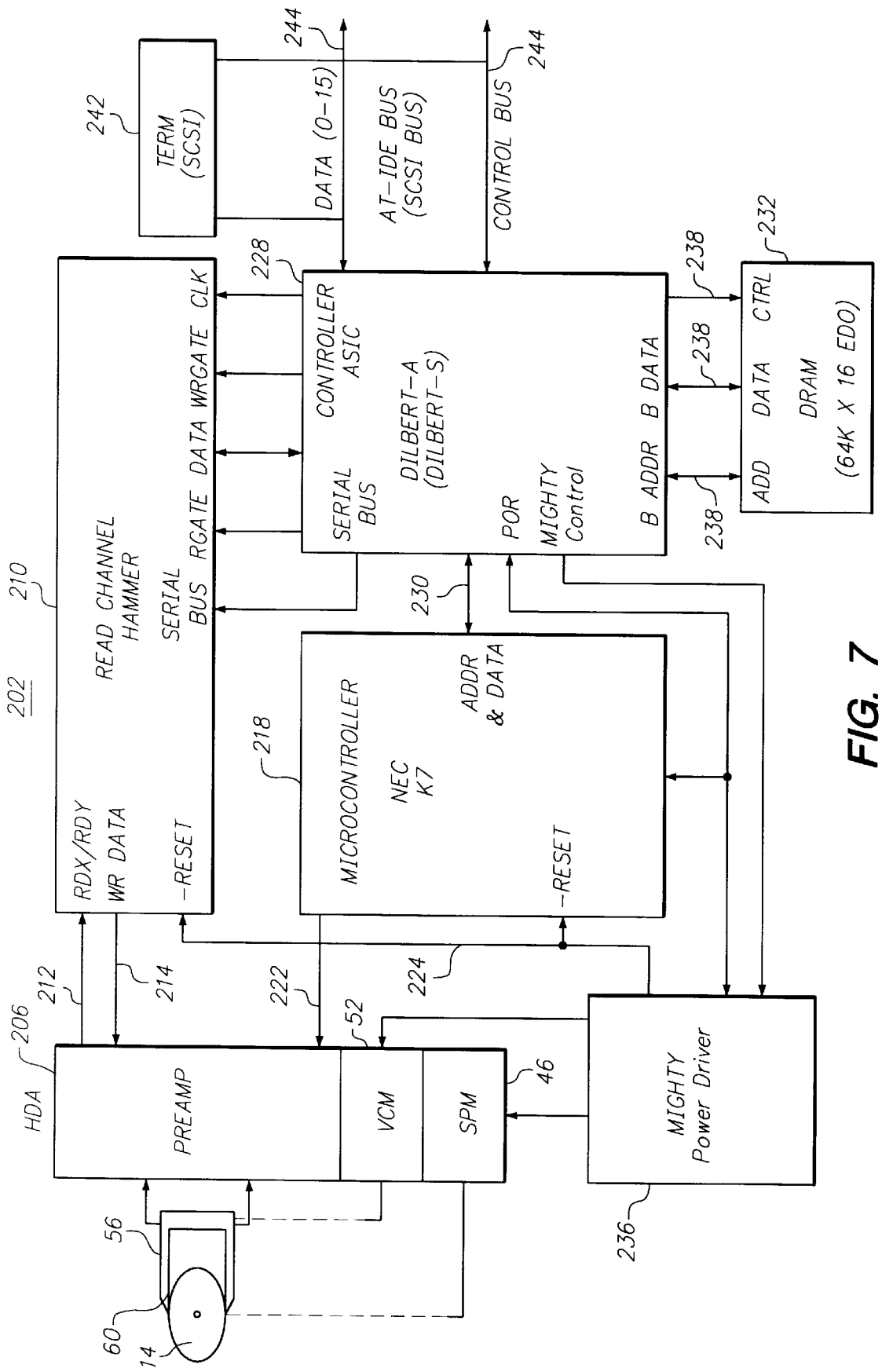
FIG. 7 illustrates a functional block diagram of the electronic control system of the disk drive assembly shown in FIG. 1.

FIG. 7 illustrates the electronic control circuitry, shown generally at 202, of the disk drive assembly 10. At least portions of the circuitry 202 are formed upon the printed circuit board 38 (shown in FIG. 1). The control circuitry 202 is operable to control read and write operations, here upon the data disk 14. To effectuate such control over the read and write operations, the control circuitry necessitates controls operations of the head actuator assembly 52, represented in the Figure by the voice coil motor thereof, and controls operation of the spindle motor assembly 46. As described previously, the spindle of the spindle motor assembly 46 generates rotational forces to impart rotational movement to the data disk 14. And, the head actuator assembly is operable to position the MR head transducers 60 proximate to desired storage locations formed upon the top and bottom surfaces of the data disk 14.

When, for instance, an appropriate one of the head transducers 60 is positioned to read data stored at selected locations of the data disk 14, signals indicative of the data stored thereat are provided to a pre-amplifier 206. In the exemplary embodiment, the pre-amplifier 206 is of an MR type, having current bias, current sense. The pre-amplifier exhibits rise and fall times on the order of 3.5 nanoseconds and exhibits a voltage gain of 200 V/V at Rmr=25 watts, having a run power of 520 milliwatts and a sleep power of 55 milliwatts.

The pre-amplifier 206 is coupled to a read channel circuit 210 by way of lines 212 and 214. In the exemplary embodiment, the read channel circuit 210 is formed of an AT&T (tm) Hammer device, type MSIZIE, having a PR4 front-end, and a post-processor back-end. In such an embodiment, the read channel circuit performs similar to a front-end EPR4 (Extended Class 4 Partial Response) device. The postprocessor, back-end contains a (1+D) filter and an Error Event Detector. The read channel circuit 210 supports 16/17 code and up to 140 Bv/s data rates.

Additional features of the read channel circuit 210 include, inter alia, a variable data rate of 25–140 Mbs using the 16/17 density code, a five-step, 12 dB range input attenuator to extend AGC (automatic gain control) range, an ENDEC which supports 16/17 and 8/9 codes, a programmer 1, 2, 4, or 8-bit wide controller data interface, and adaptive amplitude asymmetry cancellation, useful with an MR head transducer. The read channel circuit 210 is permitted to be powered by a single +5 V supply exhibiting 1050 mW full-power nominal at a highest data rate, and less than 15 mW during power-down modes. Three programmable, 5-bit current DACs provide independent R/W head bias control, T/A threshold. Communications to the read channel circuit 210 can be provided by way of a 40-MHz serial interface, and a servo Adc provides 9-bit analog-to-digital conversion of servo burst amplitudes.

The electronic control circuitry 202 further includes a microcontroller 218, here an NEC (tm) $\mu$PD787012 and $\mu$PD78P7012, members of the NEC, K-series microcontrollers. Such devices are 32- and 16-bit devices, respectively exhibiting minimum instruction times of 60 ns at 33 Mhz.

The microcontroller 218 is coupled to the pre-amplifier 206 by way of lines 222, to the read channel circuit 210 by way of bus 224 and to a CMOS VLSI ASIC 228 by way of a bus 230. In the exemplary embodiment, the ASIC 228 combines a programmable, RAM-based disk formatter, a high-bandwidth buffer controller, and a host interface for both ATA and SCSI standards. The ASIC 228 forms ten functional blocks: 1) a host interface, 2) a buffer control, 3) a motor interface, 4) a servo control, 5) a serial interface, 6) a microprocessor interface, 7) a formatter block, 8) error correction control, 9) analog PLL, and 10) a top test.

The host interface module is operable to form an interface pursuant to an ATA standard interface or an SCSI interface. The servo control module formed of, inter alia, the controller 218 and ASIC 228, generates control signals for burst amplitude measurement, supports tri-burst and quad-burst servo wedges, detects necessary syncs 2T versus 3T in wedge areas, reads track numbers in wedge area, supports thermal asperity logic, and provides write and read burst correction value in wedges (BCV) . And, the control disk read/write and ECC module generates read gate, write gate, etc. for R/W components, handles split data fields for constant rate servo wedges in multiple zone drives, supports overlapping read, supports thermal asperity location pointers, and provides "ECC on-the-fly" hardware calculations and firmware corrections.

The microprocessor interface module of the ASIC 228 supports the K7 and NEC (tm) microprocessors, provides a single-crystal architecture used for both system and microprocessor clocks, provides memory mapping to allow access to a full D-RAM 232, performs de-multiplexing of a MAD bus, generates different clock rates and allows clocks to be slowed or stopped for power-conserving modes.

The digital-to-analog converter functions provided by the ASIC 228 provides 14-bit effective, DAC formed by external 32:1 gain summing of 6- and 5-bit PWMs with 8× oversampling. The motor interface functions performed by the ASIC 228 supports requirements for power driver 236 functions. And, the analog PLL functions provided by the ASIC 228 include two APLL and AT (60 MHz for servo/buffer, 66.66 MHz for ATA/buffer), one APLL and SCSI, and utilizes an external loop filter (one resistor and two capacitors for each APLL).

The DRAM 232 is coupled to the ASIC 228 by way of address, data, and control lines 238. In the exemplary embodiment, the DRAM 232 is formed of a 64K×16, 60 ns, WE EDO DRAM in a TSOP package.

The power driver 236 is operable to drive the spindle motor of the spindle motor assembly 46 and the voice coil motor of the actuator assembly 52. In the exemplary embodiment, the power driver 236 is a fully-analog combination chip that includes both the driver for the VCM of the actuator assembly 52, the spindle motor driver, park circuity for the VCM of the actuator assembly 52, and power on reset circuitry. The power driver 236 advantageously requires no external power drive, provides dynamic breaking for non-power down situations, provides a 2A maximum spindle drive current, a 1.2A maximum VCM drive current, and provides a soft-switching spindle drive. The power on reset circuitry monitors both 5 v and 12 v power supplies, provides for auto-parking of the VCM with braking action in case of a powerdown, and provides a thermal monitor output.

The electronic control circuitry 202 further includes an SCSI integrated activated terminator 242. The terminator 242 is an 18-channel, monolithic active terminator designed for single-ended SCSI bus termination. In the exemplary embodiment, the terminator 242 is formed of a silicon monolithic integrated circuit type BH595FP-Y. As illustrated, the terminator 242 is coupled to data lines and a control bus 244 extending to the electronic control circuitry 202.

ADAPTIVE SETTLE COUNT

As mentioned previously, when designing a disk drive assembly, such as the disk drive assembly 10, to permit the disk drive assembly to exhibit improved performance characteristics when operated, such improved performance characteristics increase the risk of misoperation of the disk drive assembly. Overshoot of seek operations can result in an offtrack condition, a type of disk drive assembly misoperation. The quality of the mounting of a disk drive assembly to a host computer device is, in part, determinative of the susceptibility of the disk drive assembly to overshoot. For instance, some host computer devices use slide-type mountings to obviate the need to utilize screw-fasteners. Such types of mountings of the disk drive assembly to the host computer device sometimes make the assembly particularly susceptible to overshoot, particularly when "long" seek operations are to be performed.

An embodiment of the present invention advantageously provides a manner by which to adaptively alter the number of servo samples required for actuator settling of the actuator assembly 52. Such an adaptive determination permits the performance characteristics of the disk drive assembly to be improved when the operation of the disk drive assembly so-warrants. And, if operation of the disk drive assembly in manners to exhibit such improved performance characteristics increases the rate at which the assembly is misoperable, the number of servo samples required for actuator settling are increased to ensure better that the operation of the disk drive assembly does not result in misoperation.

A running count is maintained of all write seeks excluding sequential write seeks (as sequential write seeks are low-energy seeks). If 256 write seeks occur without the occurrence of an offtrack condition, the number of samples required of actuator settling is decreased by one unless that number is already at a programmable (by, e.g., a configuration page) minimum. Conversely, each time in which a non-sequential write seek precipitates an overshoot resulting in an offtrack condition, the number of samples required to settle is increased by one unless the number is already at a programmable (again, e.g., by way of a configuration page) maximum.

In a poorly-mounted drive, overall write seek performance is slowed down to achieve approximately one offtrack condition in 256 write seeks provided that the mounting is not so bad that the maximum settle count cannot prevent a determination that the actuator has settled before the disk drive assembly has stopped moving. Conversely, in a well-mounted drive, write seeks are performed very quickly. The maximum number of seeks without the occurrence of an offtrack condition required to decrement the settlement count is high enough to be sure that the disk drive assembly is mounted in a stable environment, but not so high that an unreasonably long number of seeks are required to be successfully performed prior to decrementing the count. When powering-up, the minimum number of settle counts are first utilized. If the power-up occurs in an environment susceptible to overshoot, a single occurrence of an offtrack condition increases the settle count by one so that the maximum settle count is quickly reached. In one exemplary embodiment, the minimum settle count for non-sequential write seeks is four and the maximum settle count is ten.

Figure 8:
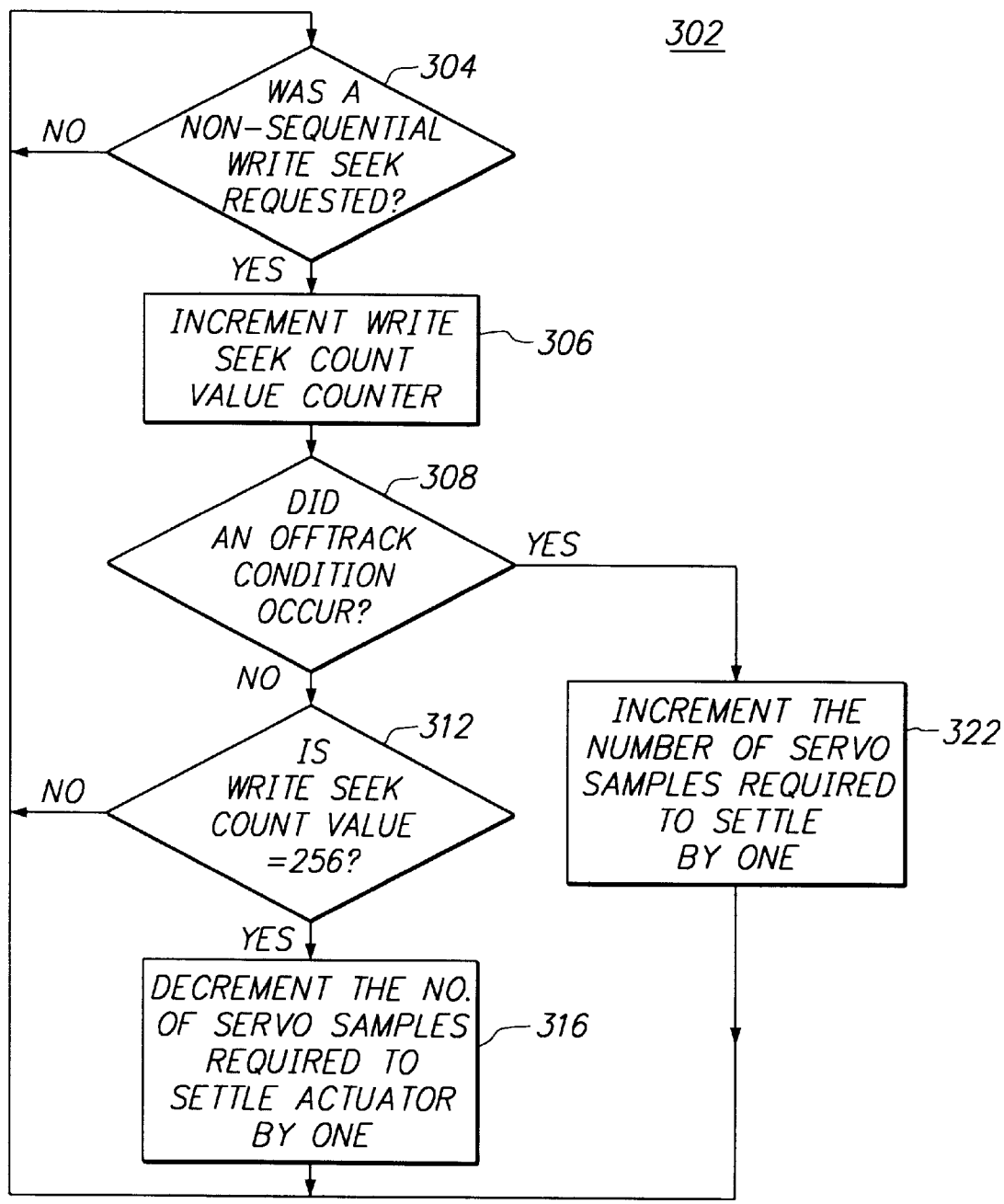
FIGS. 8–16 illustrate method flow diagrams listing the method steps of various methods of various embodiments of the present invention carried out during operation of the disk drive assembly shown in FIG. 1.

FIG. 8 illustrates a method, shown generally at 302, by which to implement the adaptive settle count determination. First, and as indicated by the block 304, a determination is made as to whether a non-sequential write seek is requested. If not, the no branch is taken back to the decision block 304. If a non-sequential write seek is requested, the yes branch is taken to block 306 whereat a write seek count value counter is incremented. Then, at the decision block 308, a determination is made as to whether an offtrack condition occurred. If not, the no branch is taken to the decision block 312, and a determination is made as to whether the write seek count value equals 256. If not, the no branch is taken back to the decision block 304. Otherwise, the yes branch is taken to block 316 whereat the number of servo samples required to settle the actuator is decremented by one.

If a determination is made at the decision block 308 that an offtrack condition occurred, the yes branch is taken to block 322 and the number of servo samples required to settled is incremented by one.

IDLE HEAD SWITCHES FOR MR HEAD LIFE EXTENSION

MR head transducers are susceptible to depletion, and such depletion is referred to as electro-migration. The depletion is caused by application of DC bias currents to the MR head transducer. At greater current levels, the amount of depletion correspondingly increases. While an increased level of DC bias currents permits the amplitude of signals generated by the MR head transducer to be increased, such increase is at the expense of an increase in problems associated with electro-migration.

Therefore, attempts are sometimes made to "save" idle power when commands are not being executed by the disk drive assembly. The read channel circuit 210 and the preamplifier 206 (shown in FIG. 7) are turned on only during and slightly before reading servo wedge information. Such actions also minimize electro-migration as the bias currents are not applied to the MR head transducer when the preamplifier is not powered. If no commands are received for a selected time period, a short seek away from an existing head transducer position is sometimes also executed to avoid MR head transducer "flying" for extended idle periods over the same spot upon the data disk. This reduces media wear and also reduces idle power. The spindle power is reduced because the idle seeks direct the position of the MR head transducer towards the inner half of the data disk whereat linear head velocity and wind resistance are lower.

In an embodiment of the present invention, sequential switching between MR head transducers of the disk drive assembly occurs each time in which an idle seek is performed so that in the idle mode, the MR head transducer bias on-time is shared equally among all available head transducers instead of applying current only to the last-used head transducer. As a result, higher bias currents can be applied to the MR head transducers without causing a corresponding reduction in the head transducer longevity.

Figure 9:
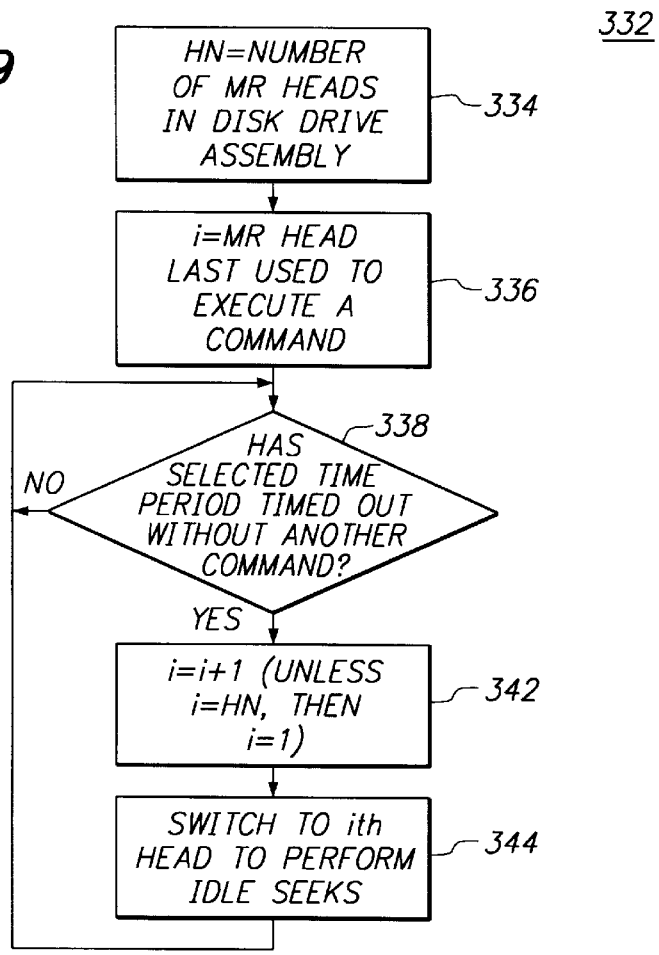

FIG. 9 illustrates a method, shown generally at 332, of an embodiment of the present invention by which to sequentially switch between MR head transducers of a disk drive assembly each time in which an idle seek is performed. First, and as indicated by the block 334, the number of MR head transducers in the disk drive assembly is defined, here indicated by HN. Then, and as indicated by the block 336, the identity of the MR head transducer last-used to execute a command is defined, here indicated by i.

Thereafter, and as indicated by the decision block 338, a determination is made as to whether a selected time period has timed out without the reception at the disk drive assembly of another command to be executed. If the time period has not timed out, the no branch is taken back to the block. Otherwise, if the time period has timed out, the yes branch is taken to the block 342, and the value of i is incremented. If, the value of i is at a maximum, the value is reassigned with the value of one. Then, and as indicated by the block 344, the newly-identified, ith head transducer is used to perform a subsequent idle seek. Iterative sequencing through successive ones of the MR head transducers of the disk drive assembly is thereby effectuated.

LOW BANDWIDTH MODE IF IDLE

Resonance of mounting rails used to mount the disk drive assembly to a host computer device lining-up with resonant frequencies of the disk drive assembly when the servo is operated at a nominal bandwidth can cause instability of the disk drive assembly. Sometimes, a several-second time period elapses prior to such instability.

In an embodiment of the present invention, whenever a command is not being executed, the servo of the disk drive assembly is operated at a bandwidth ten percent lower than a nominal bandwidth. By operating the servo at the reduced bandwidth, an extra stability margin is created during operation of the drive in the idle mode. When selecting to operate the servo at a bandwidth lower than the nominal bandwidth, care should be exercised. Adapting should not occur once around (or twice around or three times around) feedforward while operating in the low bandwidth mode. Occasional updates to the feedforward coefficients are still provided. For example, periodically, such as every two minutes, during idle time, an idle seek is performed in which the servo is returned to nominal bandwidth. Thereafter, after a selected number of disk revolutions, e.g., twelve revolutions, after returning to the idle mode, the servo is returned to the lowered bandwidth. Waiting the selected number of disk revolutions prior to returning to the low bandwidth mode subsequent to entering the idle mode also minimizes recalculation of gain values during period of high disk activity.

Figure 10:
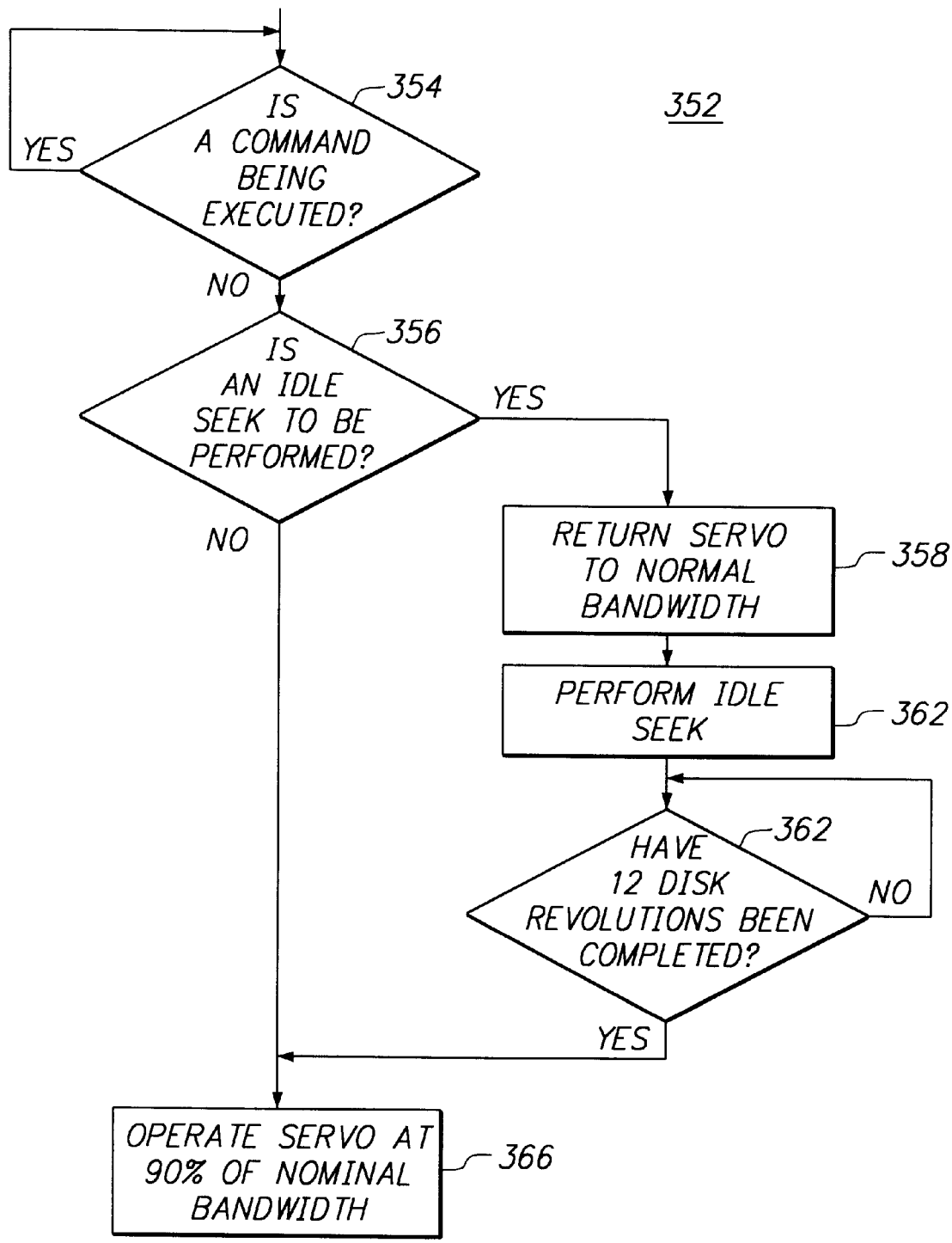

FIG. 10 illustrates a method, shown generally at 352, of operation of an embodiment of the present invention to operate a servo selectively at ninety percent of a nominal bandwidth. First, and as indicated by the decision block 354, a determination is made as to whether a command is being executed. If yes, a branch is taken back to the decision block. If not, a no branch is taken to the decision block 356. At the decision block 356, a determination is made as to whether an idle seek is to be performed. If so, the yes branch is taken to the block 358 whereat the servo is maintained, or returned, to a nominal bandwidth. Thereafter, and as indicated by the block 362, the idle seek is performed.

Then, at the decision block 364, a determination is made as to whether a selected number, here twelve, of disk revolutions have been performed subsequent to the idle seek. If not, the no branch is taken back to the decision block. Otherwise, the yes branch is taken to the block 366 and the servo is operated at ninety percent of a nominal bandwidth. If the no branch is taken from the decision block 356, the branch is similarly taken to the block 366.

MANUFACTURING RPM OVERSHOOT ON SPINUP FOR AIRLOCK RELIABILITY

Manufacturing variances of mechanical airlocks sometimes do not ensure that the airlock opens at a speed beneath that of the operating speed of the disk drive assembly and to close at a rotational speed great enough to ensure that an electronic return spring, whose energy is generated by the spinning down of a motor on power off of the drive can keep the MR head transducers parked in the disk landing zone until after the airlock is closed. To better ensure that the mechanical airlock is operable as intended, in an embodiment of the present invention, the spindle motor, upon power-up, is caused to rotate at a rotation speed higher than a nominal rotational speed. Once the higher speed is reached, the spindle motor coasts down to the nominal rotational speed.

A time out procedure is used in the event that a spindle motor is incapable of achieving the increased rotational speed. For instance, the spindle motor is instructed to spin up to the increased rotational speed, e.g., 5800 rpm, until such a rotational speed is achieved or a selected time period, e.g., thirteen seconds, times out. And, a maximum, overall time out at which to achieve the increased rotational speed is a second, selected rotational speed, such as eighteen seconds. The two time outs should not overlap. Selection of the time of the first time out should be long enough subsequent to motor power-up so that the worst-case motor under worst-case conditions (i.e., high temperature and low voltage) shall be able to achieve a rotational speed of, here, 5400 rpm. Otherwise, the disk drive assembly might utilize two time outs to attempt an overspin, or in the case of overlapping time outs, the disk drive assembly shall fail to reach the desired rotational speed if unable to reach the overspeed value. While such operation of the spindle motor at a rotational speed in excess of the nominal rotational speed causes slightly increased spin-up time, particularly at low voltages, the designed opening and closing speed of the airlock can correspondingly be selected to be of a higher rotational speed due to the increased margin on the opening speed. Such increased margin can be used to account for variation in mechanical assembly.

Figure 11:
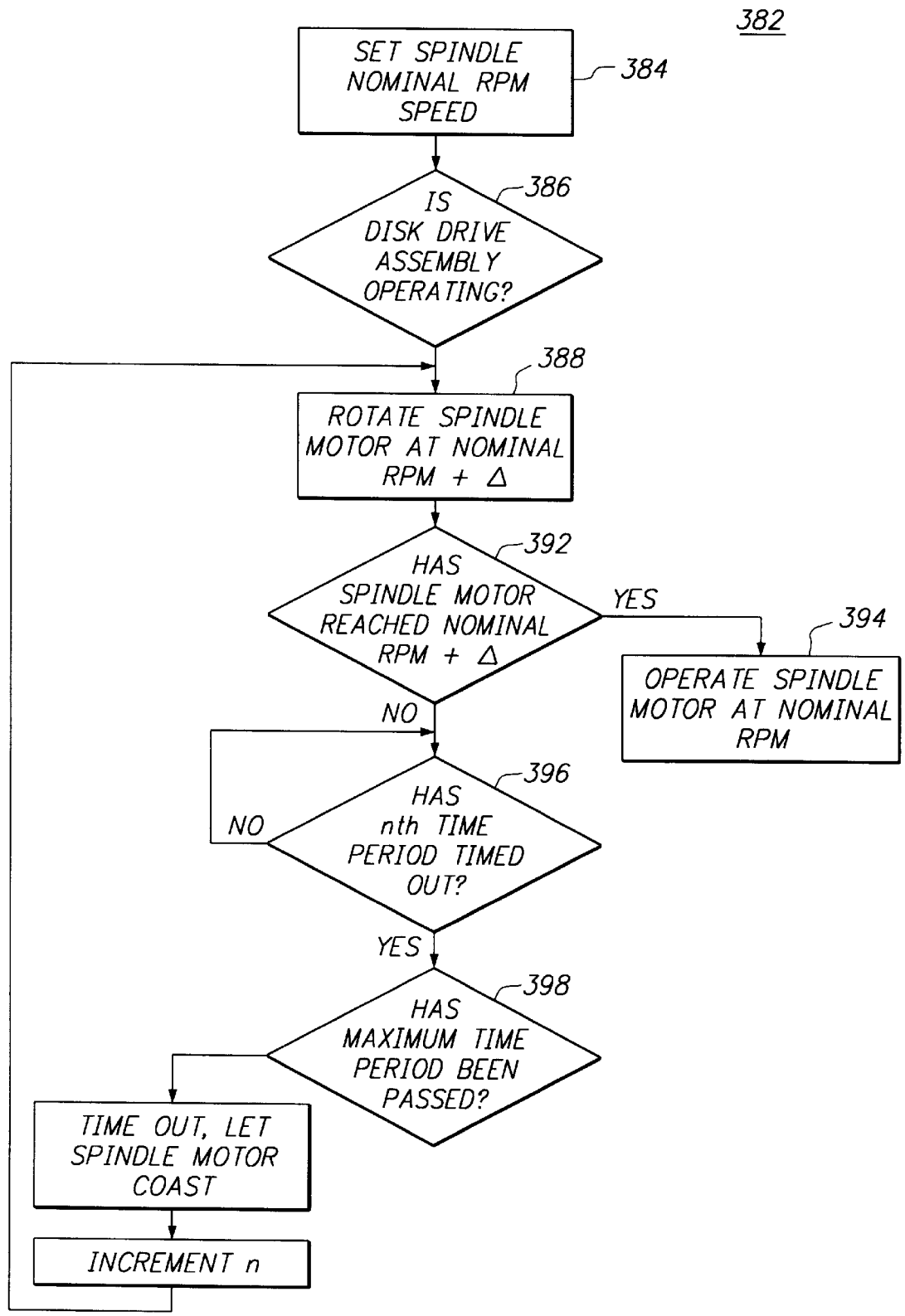

FIG. 11 illustrates a method, shown generally at 382, of operation of an embodiment of the present invention by which to effectuate the increased power-up rotational speed of the spindle motor. First, and as indicated by the block 384, the nominal spindle rotational speed is set. Then, and as indicated by the decision block 386, a determination is made as to whether the disk drive assembly is to be powered-up. If not, the no branch is taken back to the block. Otherwise, the yes branch is taken to the block 388, and the spindle motor is rotated at a nominal rotational speed in excess of the nominal rotational speed.

Then, and as indicated by the decision block 392, a determination is made as to whether the spindle motor has reached the overspeed value. If so, the yes branch is taken to block 394, and the spindle motor is permitted to coast down to the nominal rotational speed. If, however, the spindle motor has not reached the overspeed value, the no branch is taken to the decision block 396 and a determination is made thereat as to whether a time period has timed out. If not, the no branch is taken back to the block.

Otherwise, the yes branch is taken to the decision block 398 and a determination is made as to whether a maximum time period has timed out. If so, the yes branch is taken to the block 394 and the spindle motor is operated at the nominal rotational speed. Otherwise, the no branch is taken to the block 402 and a time-out is entered. During the time-out, the spindle motor is permitted to coast. Then, at the block 404, the number of time periods during which the spindle motor is attempted to be operated at the overspeed value is incremented and a branch is taken back to the block 388.

SPINDLE RPM OVERSHOOT ON SPINUP RETRIES

While the disk drive assembly should be constructed so that the airlock shall open, the normal spin-up time of the spindle motor should not be too significant. Evidence of the position of the airlock can be obtained by determining whether information is detected by the MR head transducer. If data, such as the servo address marks, are not detected, the reason for the failure to detect the information on the disk might be that the airlock had not opened. By increasing the rotational speed of the spindle motor an additional increment above the nominal rotational speed plus the selected amount might facilitate opening of the airlock. And, by providing an impulse to the actuator assembly, such impulse might impart forces further to facilitate opening of the airlock.

Figure 12:
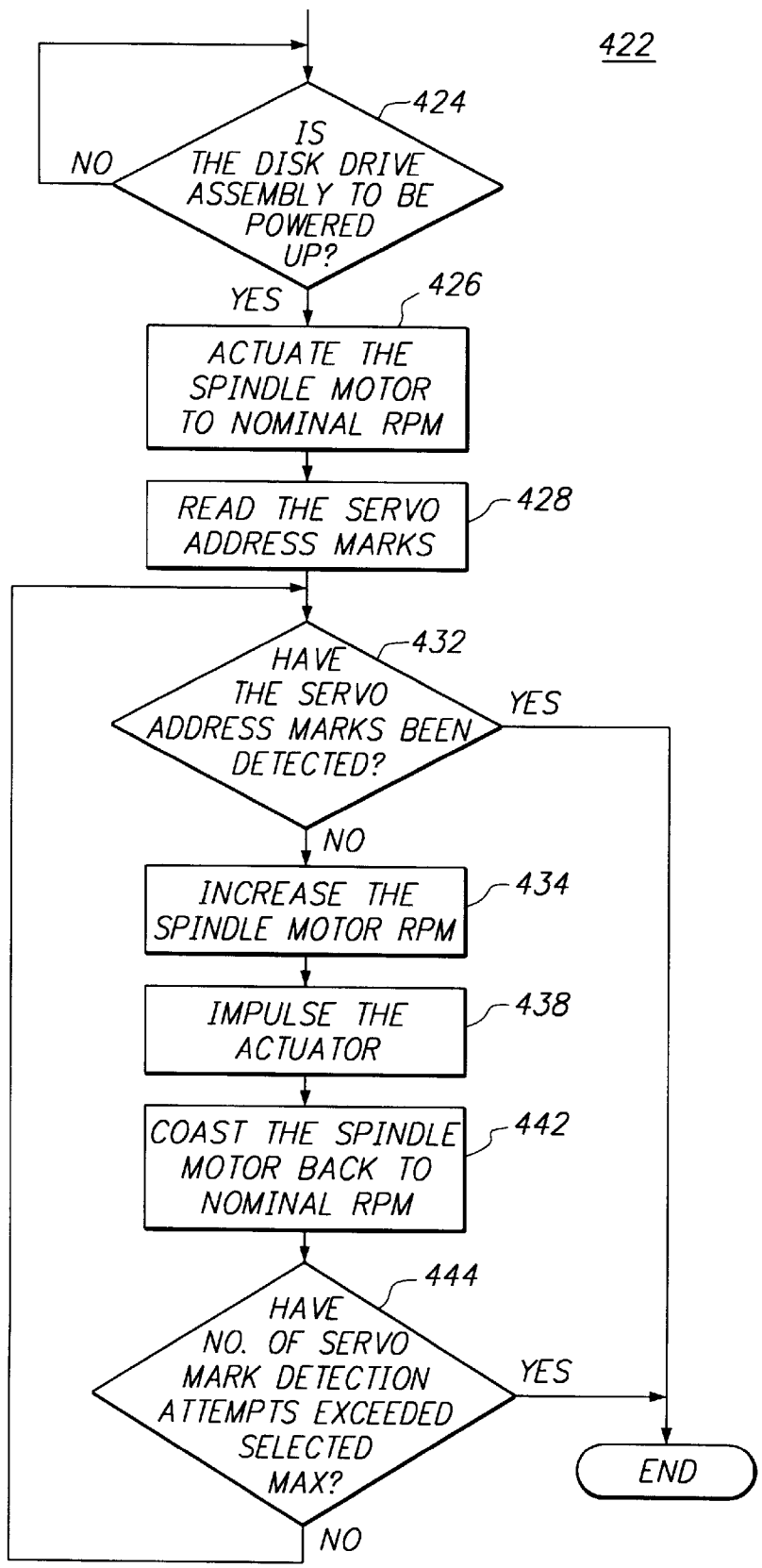

FIG. 12 illustrates the method, shown generally at 422 of an embodiment of the present invention by which to facilitate opening of the airlock of a disk drive assembly. First, and as indicated by the decision block 424, a determination is made as to whether the disk drive assembly is to be powered-up. If not, the no branch is taken back to the decision block. Otherwise, the yes branch is taken to the block 426 and the spindle motor is actuated to rotate at a first rotational speed in excess of a nominal rotational speed. An attempt is made, as indicated by the block 428, to read the servo address marks stored on the data disk of the disk drive assembly. A determination is made, as indicated by the decision block 432, as to whether the servo address marks have been detected. If so, the airlock is opened, and the yes branch is taken to the end block 434.

Otherwise, the no branch is taken to the block 434. As the failure to detect the servo address marks might be further reason that the airlock has not opened to permit such reading of the servo address marks, the rotational speed of the spindle motor is caused to be of a second selected rotational speed in excess of the rotational speed at which the spindle motor had been caused to be rotated. And, as indicated by the block 438, the actuator assembly is impulsed with a current of a short duration to impart a torque upon the actuator arm of the actuator assembly and, hence, the airlock, to provide additional forces to urge the opening of the airlock.

Then, and as indicated by the block 442, the spindle motor is coasted back to a nominal rotational speed. At decision block 444, a determination is made as to whether a selected number of attempts to read the servo address marks has been exceeded. If so, failure is indicated and the yes branch is taken to the end block. Otherwise, the no branch is taken back to the decision block 432.

PREDICTIONS OF OVERSHOOT

As also mentioned previously, the disk drive assembly is more susceptible to overshoot as a result of attempts to improve the performance characteristics during operation of the disk drive assembly. When an offtrack condition occurs during a write operation, if the write operation is not aborted, an off-track write occurs. At higher TPI levels, normal overshoot limits are compelled to be expanded as track misregistration is worse than with lower TPI disk drive assemblies.

The controller of the disk drive assembly of an embodiment of the present invention includes a state estimator which models operation of the disk drive assembly. By making use of estimations made during modelling of the operation of the disk drive assembly, estimated overshoot resulting in an offtrack condition can be anticipated. By anticipating the occurrence of an offtrack condition, a write operation can be aborted before the offtrack condition occurs rather than only thereafter. As a result, off-track writes are reduced in severity as an off-track write is more likely to be aborted prior to its occurrence. In one embodiment, separate estimators can separately model operation of the disk drive assembly. One model can be dedicated to predict the occurrence of an offtrack condition, and the other can be dedicated for controlling the position velocity of the MR head transducers.

Figure 13:
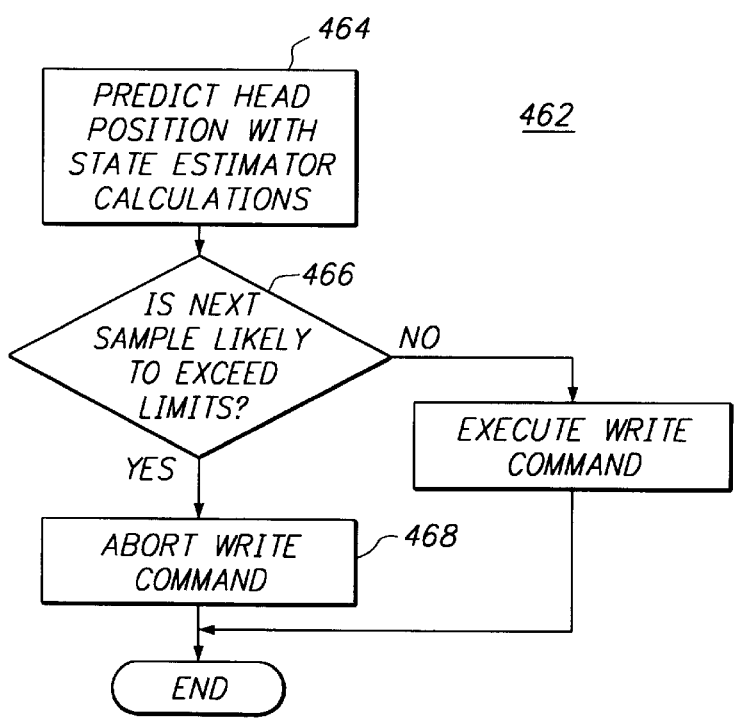

FIG. 13 illustrates a method, shown generally at 462, of an embodiment of the present invention. During operation of the method 462, use is made of the estimations made during operation of the model of the state estimator. As indicated by the block 464, the head transducer position is predicted responsive to state estimator calculations. Then, and as indicated by the decision block 466, a determination is made as to whether the next sample is likely to exceed bump limits. If so, the yes branch is taken to block 468, and a subsequent write command is aborted. If, conversely, the no branch is taken from the decision block 466, the write command is executed.

EXTRA OVERSHOOT LIMITS

Determinations can also be made indicating differences between estimates made during operation of the state estimator and actual measured values during operation of the disk drive assembly. State estimator error values are representative of the differences between the estimates and the measured values. If the estimator error is less than a selected, e.g., programmable, threshold level, the level at which an offtrack condition is indicated to occur can be extended. As a result, slow, gentle offtrack movements, such as those occurring responsive to head transducer overshoot, are permitted to have a wider limit than high-frequency shocks that might move the head transducer farther off track between single servo samples. In one embodiment, a shock sensor, such as a piezo electric sensor, is instead utilized to sense high frequency shocks.

Figure 14:
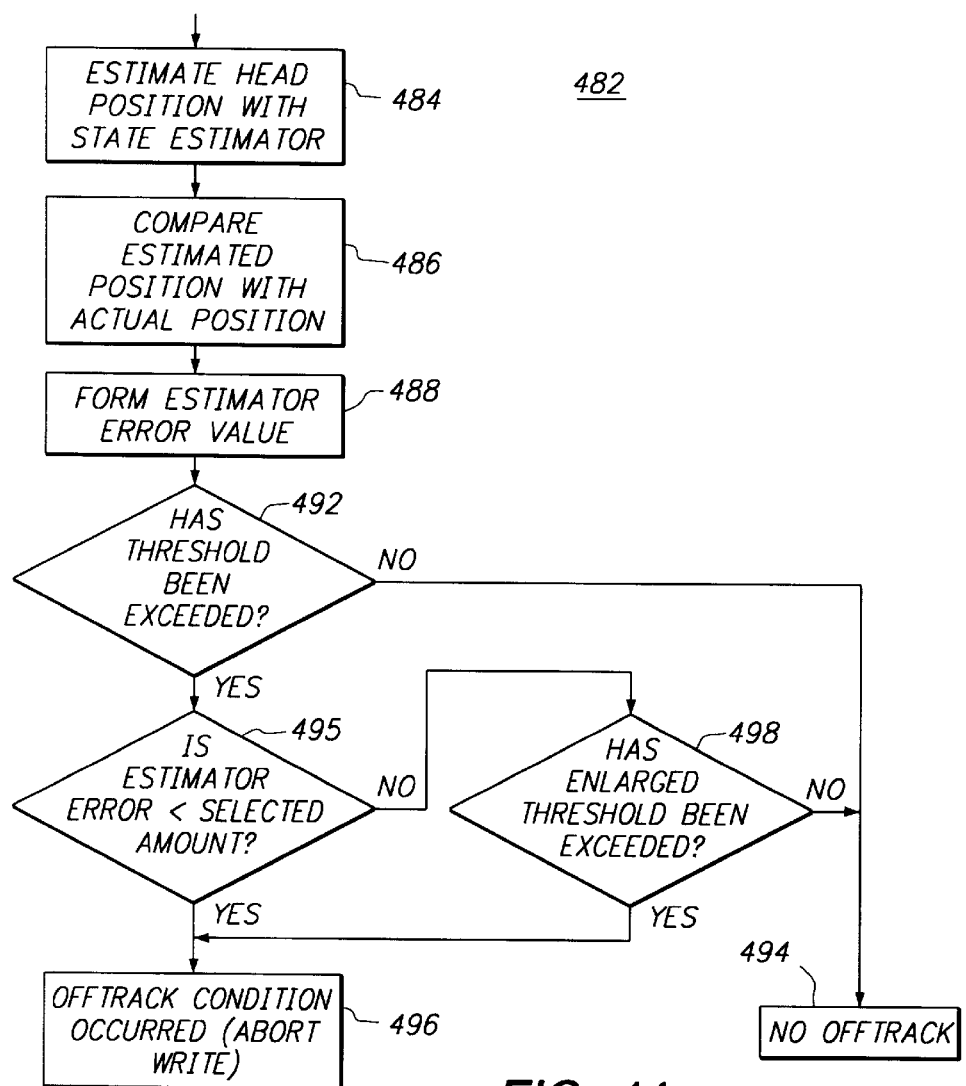

FIG. 14 illustrates a method, shown generally at 482, of an embodiment of the present invention by which to estimate better offtrack movements of significant magnitude. First, and as indicated by the block 484, head transducer positions are estimated with a state estimator. Then, and as indicated by the block 486, the estimated positions are compared with actual, measured positions. An estimator error value, indicated by the block 488, is formed of the difference between the estimated and measured values.

Then, and as indicated by the decision block 492, a determination is made as to whether a first threshold has been exceeded. If not, the no branch is taken to the block 494 as no offtrack condition has occurred. If, however, the first threshold has been exceeded, the yes branch is taken to the block 494, and a determination is made as to whether the estimator error is less than a selected amount. If so, the yes branch is taken to the block 496 and an offtrack condition is indicated to have occurred. If, however, the estimator error is greater than the selected amount, the no branch is taken to the decision block 498, and a determination is made as to whether an enlarged threshold has been exceeded. If not, the no branch is taken to the block 494. Otherwise, the yes branch is taken to the block 496.

AIRLOCK TESTING

Obtaining statistically-significant data regarding airlock opening and closing speeds during assembly and testing of disk drive assemblies is difficult. The performance of such testing, however, is important to ensure that the airlocks are operable to open and close within design specifications.

Operation of an embodiment of the present invention permits more statistically-significant data to be obtained regarding spindle motor rotation speeds at which the airlocks open and close. By changing the speed of a servo clock in proportion to changes in the speeds of the spindle motor, the servo system is better able to read servo address marks disposed upon data disks even when the spindle motor is operable at speeds other than nominal levels. Variable speed starts are thereby permitted with limited recalibration.

If the heads transducer is able to locate servo address marks and read track IDs past an unparked track at a particular speed, a determination can be made that the airlock is open. If the address marks cannot be located, the airlock is determined to be closed. By performing a series of variable speed starts, the exact spindle motor speeds at which the airlock opens and closes can be determined. And, by utilizing only a single-speed start, a determination can also be made if the airlock opens at a required, minimum speed of the spindle motor. Analogously, by utilizing a single-speed start, if detection of the servo address marks is unsuccessful, and indication can be provided that the airlock closes at a required, maximum speed.

Figure 15:
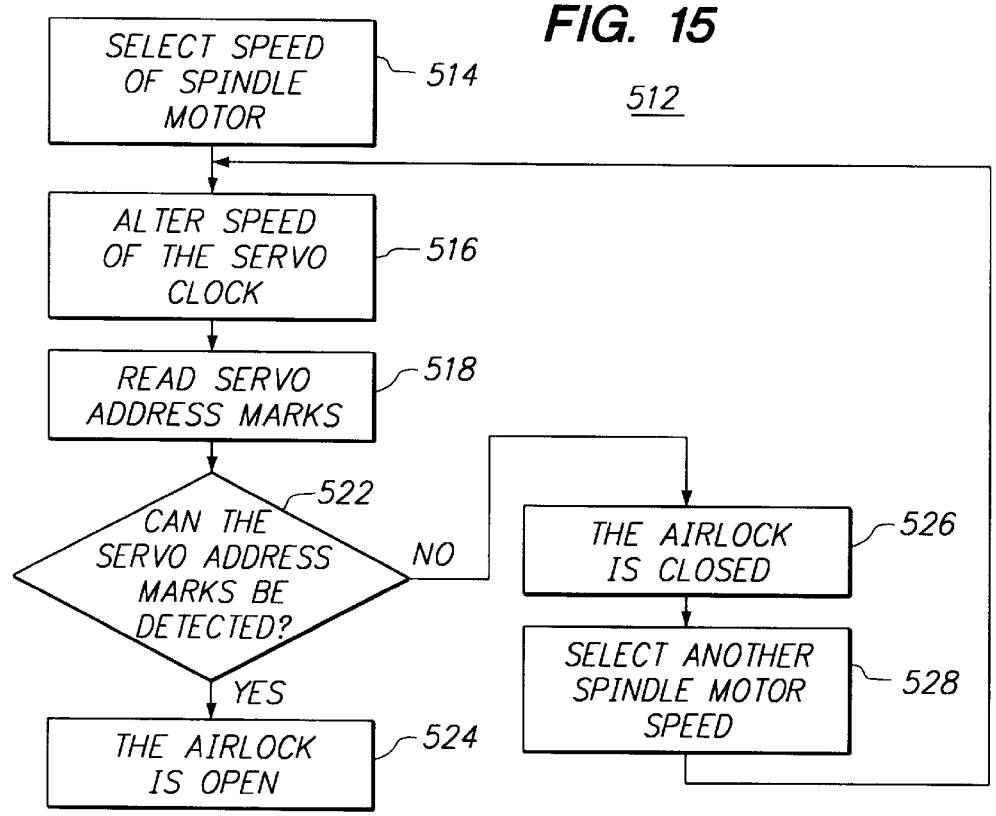

FIG. 15 illustrates a method, shown generally at 512, of an embodiment of the present invention by which a disk drive assembly can be tested to determine the spindle speed at which an airlock opens. First, and as indicated by the block 514, the speed at which the spindle motor is to be rotated is selected. Then, and as indicated by the block 516, the speed of the servo clock is altered responsive, and in proportion, to the selected spindle motor speed. Then, and as indicated by the block 518, an attempt is made to read the servo address marks.

At the decision block 522, a determination is made as to whether the servo address marks are detected. If so, the yes branch is taken to the block 524 whereat the airlock is indicated to be open. If the servo address marks cannot be detected, the no branch is taken to the block 526 whereat the airlock is determined to be closed. Then, and as indicated by the block 528, another spindle motor speed is selected and a branch is taken back to the block 516.

USE OF DIFFERENT CALIBRATION TRACKS ON RETRIES

Selected tracks in the read zone of a data disk are allocated to be used for power-up calibration. Indications of the exact location of such calibration tracks are hard-coded in a read only memory. If, however, the calibration track is a bad track, the disk drive assembly fails. Some disk drive assembly instructions, however, permit a small number of bad data tracks in a data zone without precipitating failure of the disk drive assembly. Therefore, it might be desirable not to cause a disk drive assembly to fail if a bad track happens to be a calibration track. By offsetting the location hard-coded in a read only memory with an offset value, a track, other than a bad calibration track, can instead be accessed. Thereby, the disk drive assembly is operable without requiring the calibration tracks to be good.

Figure 16:
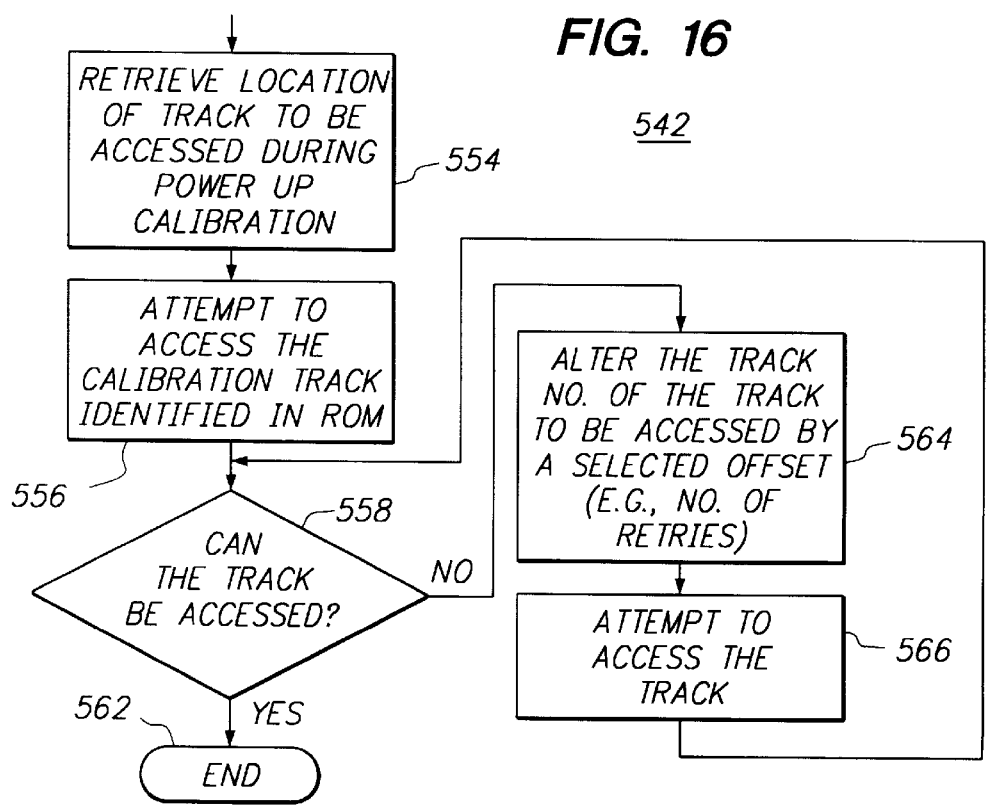

FIG. 16 illustrates a method, shown generally at 542 of an embodiment of the present invention by which to offset track location values hard-coded in a read only memory. Once offset, a track other than the calibration track is accessed during power-up.

First, and as indicated by the block 544, the location of the track to be accessed during power-up calibration is retrieved from a read only memory. Then, and as indicated by the block 556, an attempt is made to access the calibration track identified in the read only memory. Thereafter, a determination is made, as indicated by the decision block 558, as to whether the track can be accessed. If so, the yes branch is taken to the end block 562. Otherwise, if the track is bad, the track cannot be accessed, and the no branch is taken to the block 564. The track number of the track to be accessed is altered by a selected offset number, e.g., the number of retries by which an attempt to read a track is made. Then, as indicated by the block 566, the new track is attempted to be accessed.

CYCLING THROUGH MR BIAS AND AGC VALUES DURING START UP

Tolerances of MR head transducers require that different bias currents be applied to different MR head transducers to form signals of similar values. Therefore, bias currents applied to MR head transducers must be selectable. And, while the gain of a preamplifier circuit of the disk drive assembly can be controlled by a closed-loop, AGC (automatic gain control) circuit, such a circuit typically should not be used when flying the MR head transducer over DC-erased areas if a disk, such as might occur during power-up of the disk drive assembly. During such periods, a pre-selected, fixed gain value may be used. However, because of the variability of MR head transducer construction, a single default value might not provide an acceptable gain value for all disk drive assemblies. As the values of the head transducer gain and the values of the preamplifier gain cannot be predetermined, a manner by which to adaptively select such values permits better assurances that the disk drive assembly shall be properly functional. During operation of an embodiment of the present invention, tables are created in which various values of MR head transducer bias and AGC values are stored. In a subroutine which is called each time in which a lock is to be made to SAMs, all of the possible combinations of values are iterated, and selection is made of the best combinations of values to utilize at a particular disk drive assembly. The actuator bias current may further be increased or decreased depending upon the direction of movement of the MR head transducer, either toward the data disk outer diameter or the inner diameter.

Figure 17:
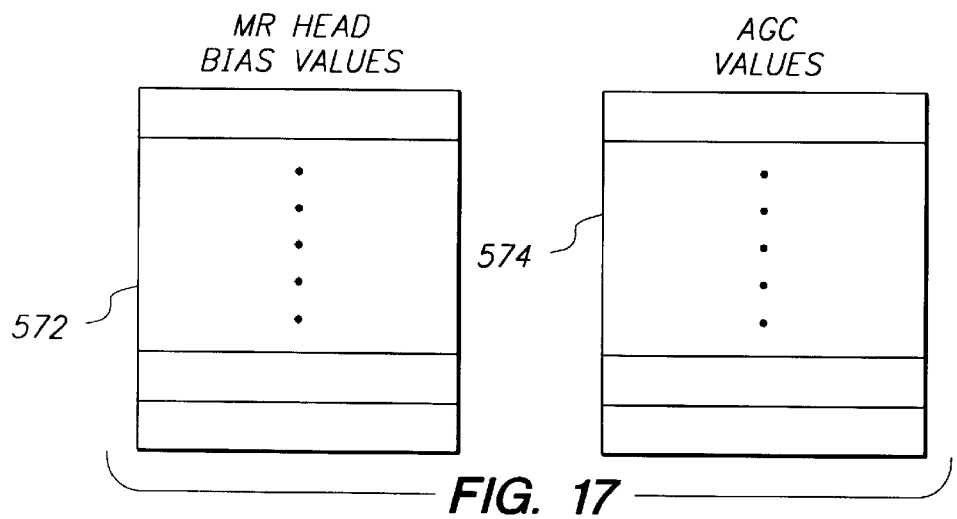
FIG. 17 illustrates tables used during operation of an embodiment of the present invention used to select MR head transducer bias values and AGC values.

FIG. 17 illustrates tables 572 and 574 in which selected values of MR head transducer bias and AGC values are stored. Iteration through various combinations of such values stored in the tables 572 and 574 permits a selection to be made to ensure that the SAM information can be read from the data disk.

SLOWING DOWN OF SEEKS ON THERMAL WARNING

During performance testing of a disk drive assembly, seek tests are also performed at temperatures higher than normal. Such high-temperature seek tests generate potentially significant levels of thermal energy during their performance. Such testing is atypical of normal operation of the disk drive assembly. During such testing, however, such generation of thermal energy might cause shutdown of the disk drive power electronics. One manner of minimizing the occurrences of thermal shutdown is to overdesign the power driver so that the power driver can withstand the thermal energy generated during the high-temperature seek tests. However, such a solution is expensive.

In an embodiment of the present invention, an internal thermistor provides an indication of excessive levels of thermal energy generation. If excess levels of thermal energy are detected, a programmable delay time is inserted after the seeks so that there is a delay before reporting completion of the seek. The same delay mechanism can be used to permit a delay to be inserted after all long seeks in the event that performance characteristics of the disk drive assembly are desired to be understated.

Because of the introduction of the delay responsive to a thermal warning indication, the performance characteristics of the disk drive assembly are reduced, but the lowered generation of thermal energy resulting therefrom reduces the occurrences of shutdown of the disk drive assembly. Thermal warning seek delays may, for example, be of delay times of 32 milliseconds. The warning thermistor may also be used to delay acceleration of the spindle motor.

POSITION SENSING ACCURACY

When performing a spin-up, performing a full recalibration, and relinquishing control of the actuator, records should still be able to be taken so that a servo writer can be used to control the MR head transducer position, but also measure what the disk drive assembly thinks the position of the head transducer to be thereby to provide and indication of the quality of the position sensing. By providing a printed circuit board with a socket and a specially-assembled read only memory, a bit which can be set via a read micro memory command permits stopping of updating of values to the PWM no matter what the servo controller commands. Avoidance of indications that the disk drive assembly is not ready and that seek commands returned successfully without performing their respective operations.

THERMAL ASPERITY DETECTION

Because particulates which form thermal asperities are not fixed into position, defect lists can be quickly filled up responsive to movement of the particulates. Operation of an embodiment of the present invention reduces the problems associated with migrating particulates.

On a final retry, before calling a routine to reallocate a sector, a servo routine is called but checks to see if the occurrence of an offtrack condition is consistent and isolated to a particular wedge of the data disk. If all surrounding wedges are clean, an indication of good status is provided, and a bit is set by, e.g., a read/write code, which tells the server not to abort reads and writes in spite of the offtrack condition indications. As a result, temperature asperities in wedges do not fill up defect lists. Defects in wedges that don't get caught in self-scan can also be written to.

POST-OVERSHOOT-CONDITION SETTLE COUNT INCREASE

In operation of another embodiment of the present invention, Z-direction shocks excite high frequency ringing, e.g., on the base casting and the suspension and actuator arm, that cause the kick-back after a shock to move a head transducer off track faster than can be adequately dealt with at a particularly sampling rate. By adding a variable for an offtrack-condition, settle count, when an offtrack condition is indicated (and an offtrack-condition is only indicated after settling has occurred) and cross back over to the zero position error line, the settle count required to recover from the offtrack condition to be on track again has changed to a new, higher-than-normal number. For example, normal settle counts are of values of two for sequential seeks and four for non-sequential seeks. A post-offtrack-condition settle count can, for instance, be set at sixteen. In order to reduce performance characteristic degradation that this might cause, reads and writes are not aborted unless the offtrack condition occurs while the read/write gate is actually asserted, not just while waiting for the appropriate wedge to come around.

CLOSED LOOP MOTOR STARTS AND ACTUATOR VIBRATION

In an exemplary embodiment, the data disks 14 and 18, shown in FIG. 1, utilize zone-textured media. Zone-textured media is laser-textured only in the landing zone areas of the disks. Remaining portions of the disks are smooth. Meniscus forces of the lubricant which wick between the head transducer and the disk cause a large amount of stiction between the head transducers and the disks. Increased levels of starting power are required to overcome the stiction forces. An embodiment of the present invention provides closed-loop commutation with vibration of the actuator assembly to facilitate drive start-up.

Spindle commutation is provided during a closed-loop commutation. The commutation is controlled by firmware via the controller. The closed-loop commutation period is the time period during which the spindle motor accelerates from a dead stop to approximately 200 rpm. During the closed-loop commutation, the rotor position is sampled every twelve milliseconds. The appropriate commutation state is chosen to provide maximum forward torque. The motor is driven at full current during the remainder of the twelve millisecond period. Then, the entire process repeats until the firmware determines the spindle speed to be approximately 200 rpm. After the spindle reaches 200 rpm, the commutation can be accomplished by a digital ASIC utilizing a back-EMF sensing method.

The rotor position detection is accomplished by way of a sensorless rotor position detection (RPD) scheme, such as that described in U.S. Pat. No. 5,028,852, the contents of which are incorporated herein by reference. An algorithm through which the RPD scheme is executed is applied repeatedly to determine the current position of the spindle motor as it spins and, in one embodiment, takes approximately two milliseconds to complete current rise time measurements. During the measurement period, the spindle motor is not actively driven and, instead, coasts due to the inertia of the rotor.

Figure 18:
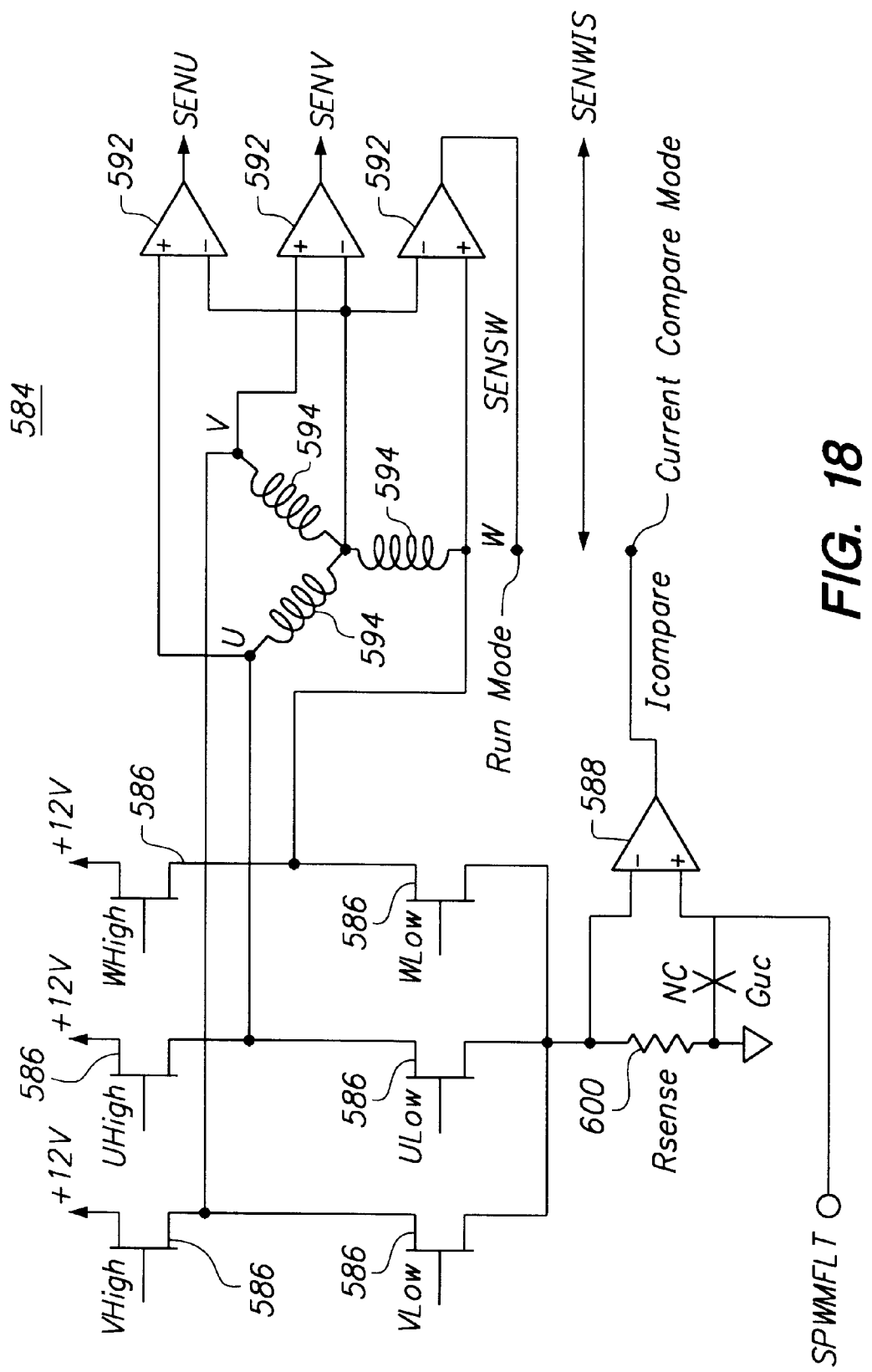
FIG. 18 illustrates an electrical circuit schematic of motor control circuitry of an embodiment of the present invention.

FIG. 18 illustrates the motor drive electronics, shown generally at 584, of the disk drive assembly of an embodiment of the present invention. The motor drive electronics 584 includes a six transistor, H-bridge having transistors 586 coupled in a conventional H-bridge, a current sense comparator 588, and three-back-EMF comparators 592. Three windings 594 of the motor and a current sense resistor are also shown in the Figure.

Figure 19:
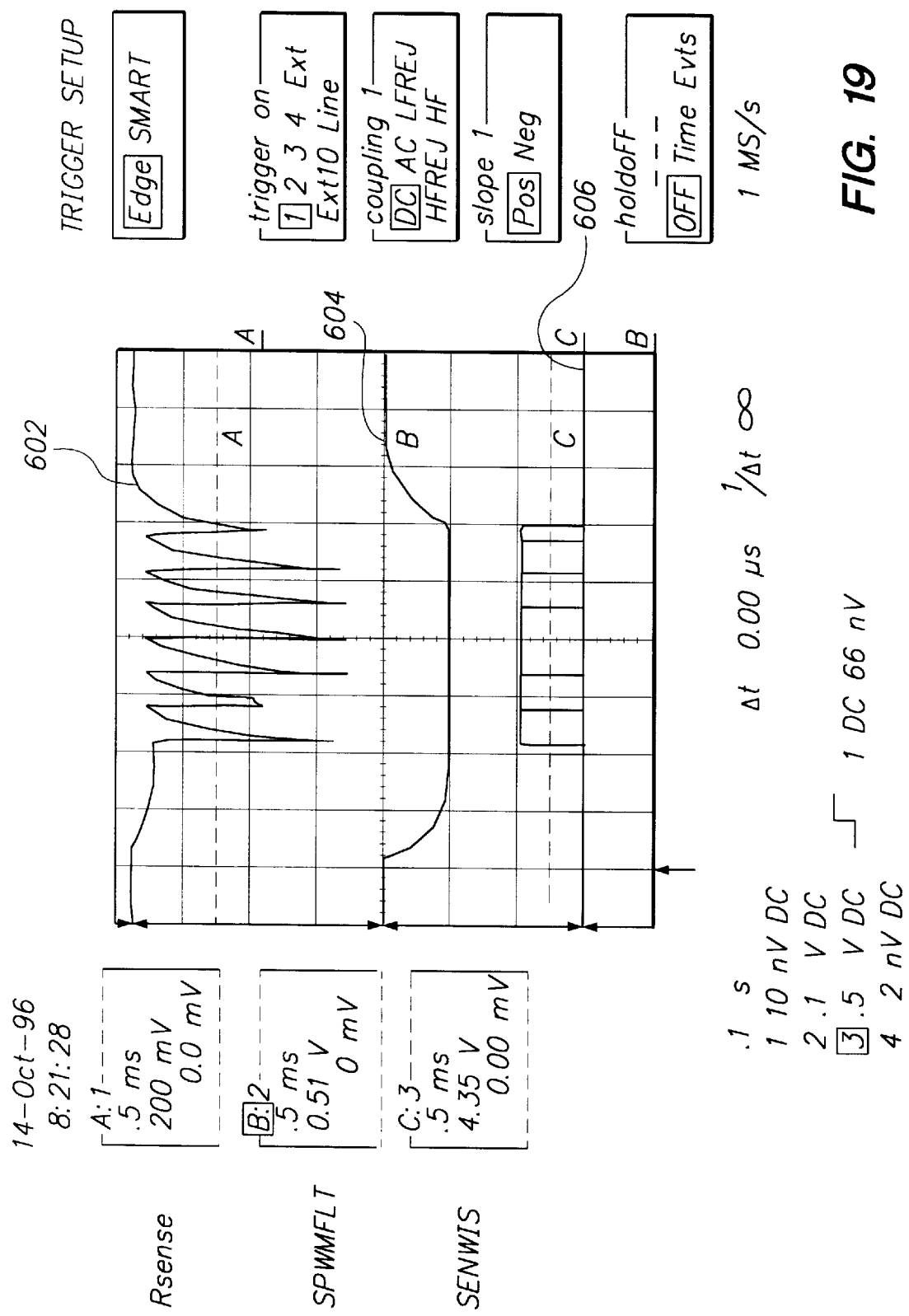
FIG. 19 illustrates waveforms generated during operation of the circuit shown in FIG. 18.

FIG. 19 illustrates a waveform 602 representing the voltage across the spindle motor current sense resistor 600. The six current rise time measurements are shown in the waveform 602. The waveform 604 illustrates an SPWMFLT signal which is an analog equivalent of the current commanded by firmware of the disk drive assembly. The signal doubles as the current threshold during a rotor position detection measurement. And, FIG. 19 further illustrates the waveform 606 which forms an SENWIS signal. Such signal is the output of the comparator used to sense that the coil current has reached a level prescribed by the current command. A low voltage indicates that the coil current exceeds the commanded current storing an RPD rise time measurement.

Figure 20:
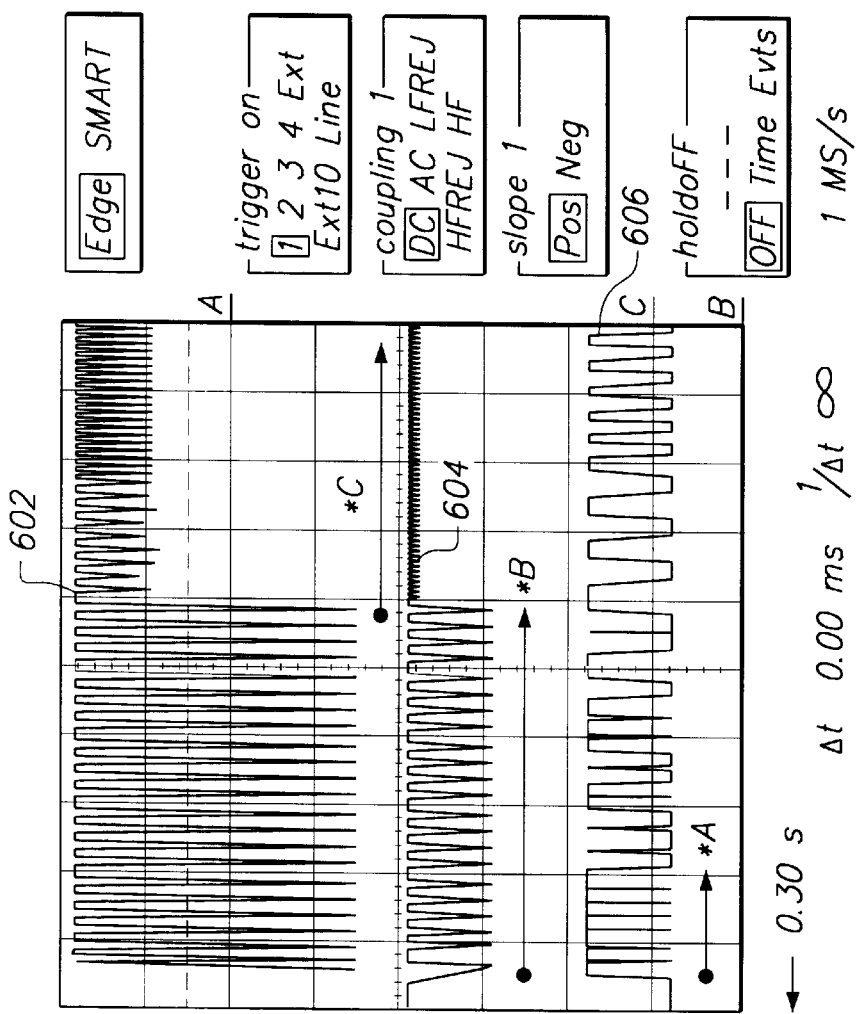
FIG. 20 illustrates waveforms, similar to those shown in FIG. 19, but scaled with a different time scale.

FIG. 20 illustrates the waveforms 602, 604 and 606, shown in FIG. 9, but here along a larger time scale, here two consecutive spindle motor sample periods of a total of twelve milliseconds. As the SPWMFLT signal serves as both the commanded current during the motor drive operation and the current threshold level during RPD measurements, the signal has a relatively slow rise time. Therefore, the signal is switched from full scale current to three-quarter scale current during the first millisecond of the twelve millisecond interval. The motor is still being driven during this time. Following such period, the spindle motor is disabled (allowed to coast) for approximately two milliseconds as an RPD measurement is taken. Once the current commutation state is determined from the RPD measurement, the appropriate phases are energized to provide maximum forward torque and the motor is again driven at full scale current until the next symbol sample period begins.

Once the motor is in the run mode, the SCNWIS line is sampled to determine if a back-EMF transition has occurred. The frequency of the back-EMF transitions is a measure of the spindle speed. The total number of spindle sample periods between transitions on the SCNWIS line is tallied by the firmware and stored in a running sequence. The sequence is a measurement of the period of one-half of a back-EMF cycle on the SENWIS line. Experimentation has shown this sequence to be a somewhat noisy measurement of the spindle velocity. Therefore, the sequence is sent through an averaging filter and the filtered output is used to determine the average spindle velocity.

The filtered output, y(i) can be represented mathematically as follows:

$$y(i)=i(i-1)-G(y(i-1)-x(i))$$

where:
- y=averaging filter output;
- x=averaging filter input;
- G=filter gain;
- i=sequence index number.

Once the output value, y(i) reaches a threshold, indicating the spindle motor has reached some velocity, the motor commutation is relinquished to a digital state machine while the command to drive current continues to be controlled by firmware.

Figure 21:
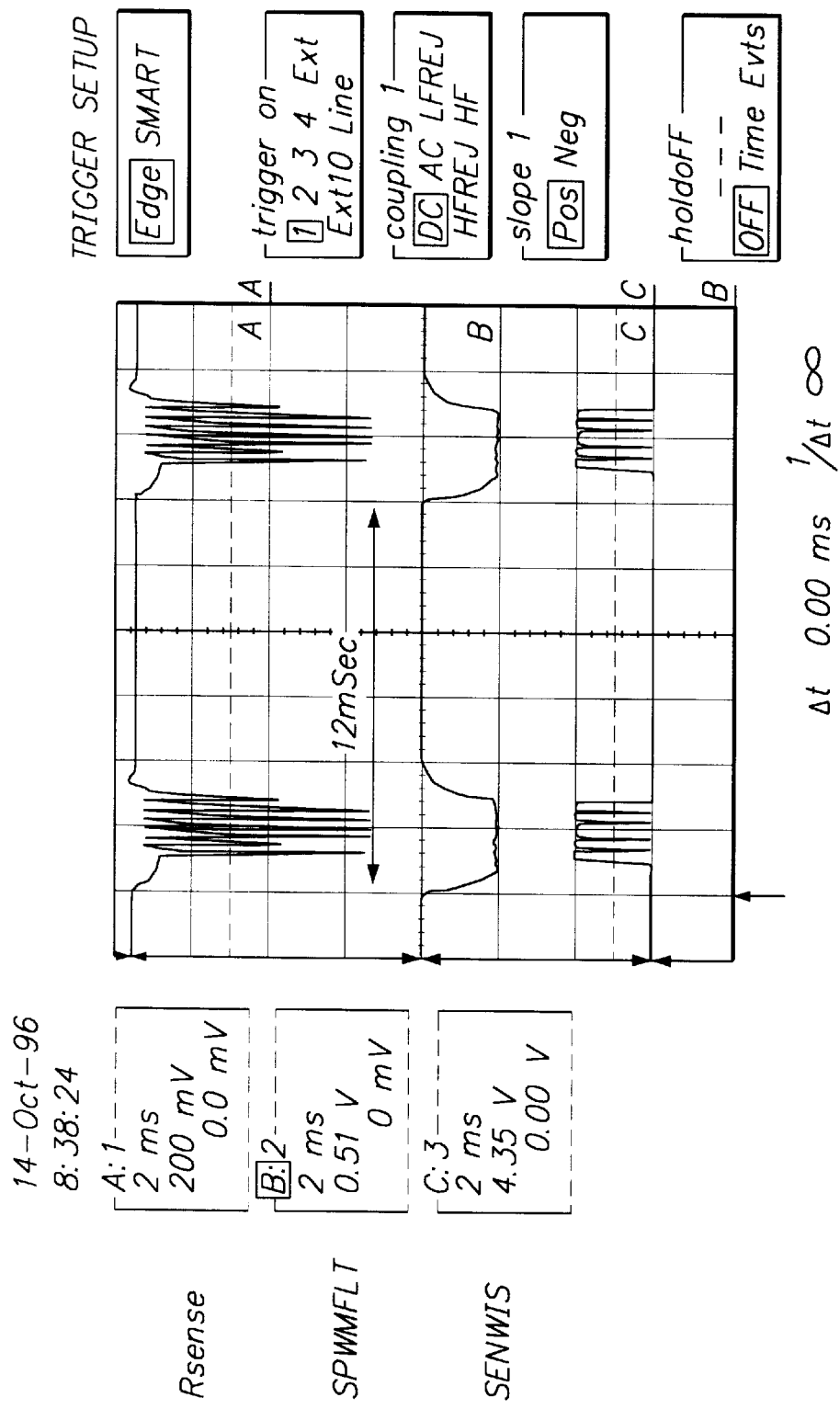
FIGS. 21 and 22 illustrate waveforms of signals measured during operation of an embodiment of the present invention.

FIG. 21 illustrates a start sequence from a spindle motor dead stop to the handoff to a digital state machine. A first period, labeled A in the Figure shows the motor accelerating from a dead stop to the speed required to achieve BEMF transitions. The period labeled B shows the remainder of the closed-loop start as the firmware commutation allows the spindle to accelerate to approximately 200 rpm prior to the hand-off to the state machine. The period indicated by C in the Figure shows the spindle as the spindle accelerates under the state machine commutation towards a final velocity.

Normal spin-up utilizes closed-loop commutation of the spindle motor as described above. The start scheme provides adequate starting torque to start under normal conditions with the head transducers of the disk drive assembly in a textured landing-zone. Additional forces, however, might be required to overcome stiction in a multi-drive assembly, particularly when the heads are positioned over outer diameters of the disks.

In an embodiment of the present invention, after a number of unsuccessful attempts to spin the spindle motor using the closed-loop commutation described above, the actuator is dithered during the spin-up attempt to help break the stiction with a side-to-side motion of the head transducer. This movement is provided by energizing the voice coil motor in one direction and then the other at fixed intervals while forward torque is applied by the spindle motor.

Figure 22:
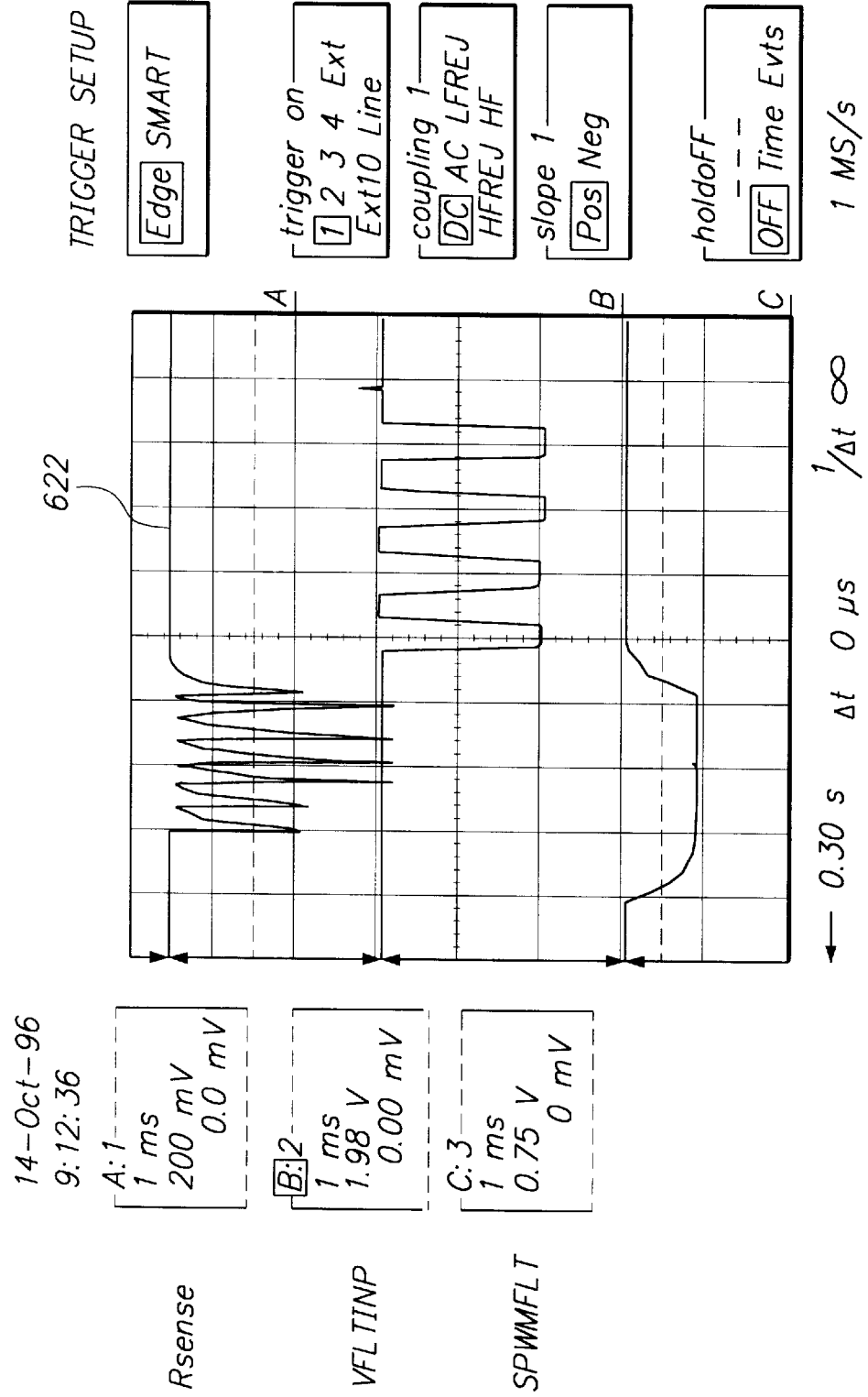

FIG. 22 illustrates an actuator assisted start. The waveform 622 shows full excursions of the commanded current. In the implementation, eight cycles of alternating polarity are applied to the voice coil motor with a duration of five hundred microseconds per cycle. During an actuator assisted start, the actuator is continued to dither during each spindle commutation period until the commutation is relinquished to the digital state machine.

ERROR CORRECTION

In an embodiment of the present invention, error correction coding (ECC) is utilized to correct and detect digital error in hard disk drives to cover soft error. The ECC functions as the agent that guarantees data integrity in the drive to prevent data miscompares or wrong data from being sent to the host without recognition.

Pseudo ECC is provided mainly to enhance the function of an existing ECC in a disk drive to correct a hard error or a known location on the disk surface of a data disk. A hard error may be caused, for example, by a growing defect or by mishandling. By providing error location detection, existing ECC operation is facilitated, and the correction span of the ECC can be approximately doubled.

An external trigger is provided to identify the location of hard error on the data disk. The entire defect area of the hard error is gated out. Through such a gating function, the controller blanks out the defect area so that the defect area appears to be a long period of erasure bits.

The hardware trigger can be implemented by using one of the error types used in Viterbi detection of the channel that is associated with a PRML-type channel. This trigger allows the controller to recognize the location of the defect. Indications for instance, can be provided by way of electrical connections that are provided to the controller.

Figure 23:
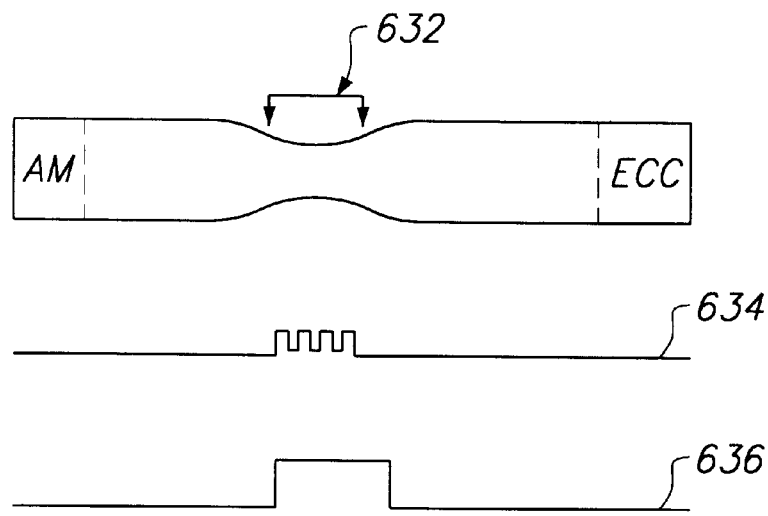
FIG. 23 illustrates signals generated during operation of an embodiment of the present invention used during ECC procedures.

FIG. 23 illustrates exemplary operation of an embodiment of the present invention. A defect area 632 located on the data disk 14 is indicated as areas exhibiting an amplitude drop. A trigger signal 634 is generated having pulses located at the error event. The trigger signal is applied to the controller. Once the triggering location is identified, the controller initiates a blanking signal to block out the defect area so that the defect area can be recognized as a long burst of erasure error. The blanking signal 636 is representative of such a signal.

The blanking signal also utilizes, as a dynamic loop control signal for a PRML channel to retain the performance during the defect area. It helps the channel to free the timing control loop, VGA loop to allow the channel to coast through the defect area without losing performance.

Figure 24:
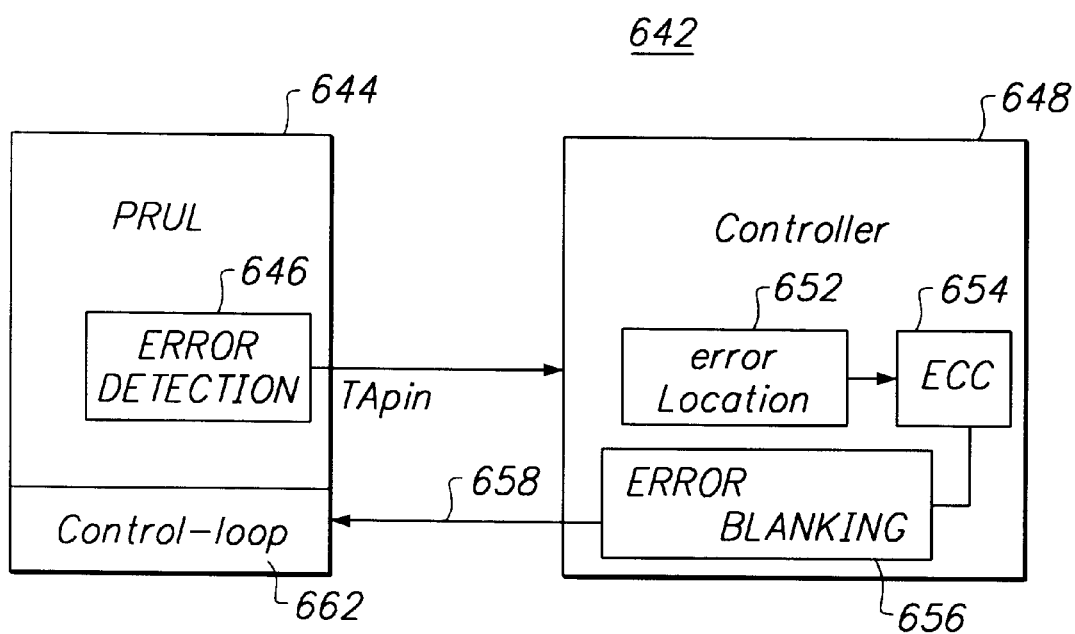
FIG. 24 illustrates functionally portions of an embodiment of the present invention.

FIG. 24 illustrates the hardware architecture, shown generally at 642, having the PRML channel 644 including an error detection element 646 which generates the trigger applied to the controller 648 at the control pin thereof. Error location functionality 652 disposed within the controller 652 provides indications of the error location to the ECC 654. Error blanking functionality 656 is also disposed in the controller 648. A closed loop is also formed, here by way of line 658, to the control loop 662 of the PRML 644.

ADAPTIVE THERMAL ASPERITY THRESHOLD

As mentioned previously, thermal asperities form a source of misoperation of a disk drive assembly. An embodiment of the present invention adaptively operates the read channel circuit, or the preamplifier coupled in-line therewith, to facilitate minimization of problems caused by the existence of thermal asperities. A temperature asperity threshold level at which TA recovery is initiated is of a programmably-selectable value. The TA threshold is a voltage level. A thermal asperity causes baseline (DC level) of an analog readback signal to shift rapidly. If the baseline shift exceeds the TA threshold, the preamplifier attempts to restore the baseline by any of various techniques, for example, by changing the AC coupling to the reduce the time constant so the baseline returns to its proper value quickly. The recoverability of the data depends upon the threshold used. The threshold can, for example, be based upon signal amplitude, to set the threshold as close as possible to an expected optimum value.

A signal sent from the preamp to the controller at the time the preamp detects the occurrence of a TA, can be used to enhance ECC correction with erasure technique, and allow the read channels dynamic loops to coast, in the same fashion as the pseudo ECC does when triggered by a Viterbi error signal. In addition, for TA's, it can cause the channel to initiate a baseline restoration as well.

ADAPTIVE MR HEAD TRANSDUCER BIAS

As also noted previously, the MR head transducer bias current must be selected to permit acceptable operation of the MR head transducer. More particularly, it is desirable to set the bias current level so that the servo performance (TMR or PERR) is in an acceptable range while also ensuring that channel performance (e.g., MSE or data error rate) is also in an acceptable range. Sometimes only one or the other of the servo performance and channel performance are in an acceptable range. So, both must be checked and a value is picked that is best for each, if possible, but if the same bias current is not the best for both, servo performance predominates.

NON-THERMAL ASPERITY ERASURE MODE

The read/write channel can generate a digital signal (i.e., a decision quality metric) which toggles when the probability of the data being in error is high, based upon execution of a Viterbi algorithm in the read/write channel. Such a signal can be multiplexed together with the signal used to indicate the presence of a thermal asperity, and the result is used to enhance ECC correction span over the time period of expected data errors. In the case of bursts of errors that are localized at a certain place within a sector, but for which there is no thermal asperity (for example, in the case of a media defect from a scratch), the decision quality metric can be used to enhance the ECC over that area as well as for a thermal asperity.

Magnitude of read signal disturbances shortly after the completion of a write can be reduced by using certain data patterns in the written data. For instance, DC erase (low frequency data) improves W-R recovery. By writing an appropriate pattern at the end of a final sector before servo information, such pattern can improve the servo performance while writing data.

The disk drive assembly as described above provides a high capacity, high performance disk drive assembly having performance characteristics which are adaptively selectable. The performance characteristics are selectable to balance the desire of high performance with the desire to minimize misoperation of the disk drive assembly.

The previous descriptions are of preferred examples for implementing the invention, and the scope of the invention should not necessarily be limited by this description. The scope of the present invention is defined by the following claims.

What is claimed is:

1. A disk drive assembly mountable at a supportive mounting of a host device, said disk drive assembly comprising:

rotatable storage media, said rotatable storage media having servo information locations and data storage locations arranged thereupon;

a spindle motor having a spindle rotatable about a longitudinal axis, the spindle engaged with said rotatable storage media, said spindle motor for rotating said rotatable storage media at a selected rotation speed;

a MR (magneto resistive) head transducer positionable proximate to said rotatable storage media, said MR head transducer for selectively reading data stored upon, and with associated inductive write element, writing data upon, said rotatable storage media;

a voice coil motor coupled to said MR head transducer, said voice coil motor for positioning said MR head transducer proximate to selected locations of said rotatable storage media;

a read channel circuit coupled to said MR head transducer, said read channel circuit at least for processing the data read by said MR head transducer, processing performed by said read channel circuit including adaptive detection of thermal asperities formed upon said rotatable storage media; and a controller coupled to said spindle motor, said voice coil motor, and said read channel circuitry, said controller for selecting the rotation speed at which said spindle motor rotates said rotatable storage media, for adaptively actuating said voice coil motor, for controlling current flow to the MR head transducer during idle mode and for controlling operation of said read circuitry, actuation of said voice coil motor adaptively responsive to the processing of the data by said read channel circuit.

2. The disk drive assembly of claim 1 wherein non-sequential write seeks are selectively performed to position said MR head transducer proximate to non-sequential data storage media, and wherein said controller selects a number of servo samples required to settle, the number of servo samples required to settle selected by said controller responsive to determinations by said controller of whether offtrack conditions occurred during previous non-sequential write seeks.

3. The disk drive assembly of claim 1 wherein said rotatable storage media comprises at least one media disk having a top face surface and a bottom face surface, both the top and bottom face surfaces, respectively, having servo information locations and data storage locations arranged thereupon, wherein said MR head transducer positionable proximate to the top face surface and a second MR head transducer positionable proximate to the bottom surface, and wherein said controller iterates sequencing between the first and second MR heads of at least one media disk during idle mode.

4. The disk drive assembly of claim 1 wherein said controller is further operable to selectively reduce a bandwidth at which said voice coil motor is operable when write and read operations are not selected to be performed by said MR head transducer for a selected time period.

5. The disk drive assembly of claim 1 wherein said spindle motor has a nominal rotational speed associated therewith at which the spindle of said spindle motor is rotated during read and write operations performed by said MR head transducer, and wherein said controller is operable to cause selective rotation of said spindle of said spindle motor at an initial rotational speed in excess of the nominal rotational speed during initial spin-up of said spindle motor.

6. The disk drive assembly of claim 5 wherein said controller is further operable, after said spindle of said spindle motor is rotated at said initial rotational speed, to cause at least one impulse current to be applied to said voice coil motor.

7. The disk drive assembly of claim 1 wherein said controller further comprises a state estimator, said state estimator forming a model which forms estimates modelling operation of said disk drive assembly, estimates formed by said state estimator including predictions of occurrences of offtrack conditions, and wherein said controller is further operable to abort write procedures of said MR head transducer by selectively actuating said voice coil motor when said state estimator predicts an occurrence of an offtrack condition in excess of a first bump threshold.

8. The disk drive assembly of claim 7 wherein said controller is further operable to form error values representative of differences between estimates formed by said state estimator and measured operational parameters, wherein selective actuation of said voice coil motor to abort the write procedures is further responsive to the error values, such that, if the error values are within a selected range, the write procedures are aborted only if said state estimator estimates an offtrack condition in excess of an expanded offtrack condition threshold, the expanded offtrack condition threshold greater than the first threshold.

9. The disk drive assembly of claim 1 further comprising a servo clock having a selectable clock speed, the clock speed selectable by said controller, and wherein said controller is operable in a test mode, the test mode including a test for testing at what rotational speed of said spindle motor that servo information stored at the servo information locations of said rotatable storage media can be read by said MR head transducer, the test sequencing the rotational speed of said spindle motor through a sequence of rotational speeds, said controller, at each rotational speed of said sequence, changing the clock speed of the servo clock in an amount proportional to a corresponding rotational speed change.

10. The disk drive assembly of claim 1 further comprising a storage element for storing an address of a selected location of said rotatable storage media to be accessed during calibration operations and wherein said controller is further operable to retrieve the address stored in the storage element, to offset the address, one retrieved, by a selected offset amount to form an offset address, and to attempt to access the storage location identified by the offset address.

11. The disk drive assembly of claim 1 further comprising a gain element having an adjustable gain for amplifying signals formed by said MR head transducer, wherein said MR head transducer is biased with a selected bias amount, wherein said controller further includes a head bias look-up table containing a set of head bias amounts and a gain look-up table containing a set of gain values, and wherein said controller is further operable to select combinations of head bias amounts and gain values by which to bias said MR head transducer and said gain element during initial read operations performed by said MR head transducer.

12. The disk drive assembly of claim 1 further comprising a thermal sensor at least for sensing when temperature levels exceed a selected level, and wherein said controller is further operable to reduce rates at which said voice coil motor is actuated to position said MR head transducer proximate to selected locations of said rotatable storage media, thereby to reduce read/write rates when temperature levels sensed by temperature sensor exceed the selected level.

13. The disk drive assembly of claim 1 further comprising a rotational position sensor for sensing rotational positions of said spindle of said spindle motor, wherein said controller utilizes sensed rotational positions sensed by said rotational position sensor to commute stator windings of said spindle motor during initial power-up of said spindle motor.

14. The disk drive assembly of claim 13 wherein said controller is further operable to apply intermittent bursts of current to said voice coil motor, the bursts applied to said voice coil motor together with commutations of the stator windings of said spindle motor.

15. The disk drive assembly of claim 1 wherein said controller is further operable to determine whether detected offtrack conditions are isolated to limited radial portions of said rotatable storage media, and, if so, not to abort write procedures to selected locations of said rotatable storage media subsequent to offtrack condition indications.

16. The disk drive assembly of claim 1 wherein said read channel circuitry further comprises a preamplifier for amplifying signal values of signals formed by said MR head transducer, said preamplifier having a selectable thermal asperity threshold level, which is set to some optimum value based on knowledge of best threshold for best data recovery, and, for example, the amplitude of the readback signal, said preamplifier further for detecting when signals values formed by said MR head transducer exceeds the temperature asperity threshold level.

17. The disk drive assembly of claim 16 wherein said preamplifier is further operable to attempt to recover information of which the signals formed by said MR head transducer are representative subsequent to detection of signal values in excess of the temperature asperity threshold level, and send a signal to the controller to indicate that a TA has occurred.

18. The disk drive assembly of claim 1 wherein said MR head transducer is biased with an adaptively selected bias amount, the selected bias amount selected to provide acceptable servo performance and acceptable channel performance.

19. The disk drive assembly of claim 1 wherein said read channel circuit is further operable to attempt to recover information of which the signals formed by said MR head transducer are representative but which include a burst of errors therein, detected either by, for example, the Viterbi error detector, or the position of a thermal asperity.

20. The disk drive assembly of claim 1 wherein said controller is further operable to cause said MR head transducer and its associated inductive write transducer to append to information written to said rotatable storage media a selected data pattern, the data pattern selected to improve operation of said MR head transducer when servo information is read from said rotatable storage media.

21. The disk drive assembly of claim 1 further comprising several location error detectors for detecting portions of signals formed by said MR head transducer when reading from said rotatable storage media corresponding to hard error locations based on Viterbi error signals and detected TA locations and ECC circuitry for correcting for errors contained in the signals formed by said MR head transducer, said location error detector providing indications of portions of the signals detected to correspond to hard error locations to said ECC circuitry, said ECC circuitry recognizing the portions of the signals to be a burst of erasure error.

22. A method for controlling operation of a disk drive assembly, said method comprising the steps of:
rotating rotatable storage media at a selected rotation speed;
reading data stored on the rotatable storage media;
processing the data with read data circuitry read during said step of reading; and
adaptively controlling rates at which the rotatable storage media is rotated during said step of rotating, manners by which the data is read during said step of reading, and manners by which the data is processed during said step of processing responsive to processing of the data during said step of processing.

23. The disk drive assembly of claim 3 wherein the controller iterates sequencing between the MR head transducers to increase MR head transduces longevity.

24. The disk drive assembly of claim 3 wherein the controller iterates sequencing between the MR heads to share MR head on-time among the MR head tranducers.

25. The disk drive assembly of claim 3 wherein the controller iterates sequencing between the MR head tranducers in conjunction with idle seeks.

26. The disk drive assembly of claim 3 wherein the controller sequences to each MR head transducer after a variable time interval.

27. The disk drive assembly of claim 3 wherein the controller sequences to each MR head transducer after a fixed time interval.

28. The disk drive assembly of claim 3 wherein the controller sequences to each MR head transducer after a time interval of read/write inactivity.

29. The disk drive assembly of claim 3 wherein the controller sequences to each MR head transducer in conjunction with an idle seek after a time interval of inactivity.

30. The disk drive assembly of claim 29 wherein the controller sequences to each MR head transducer in conjunction with an idle seek after a time interval of read/write inactivity.

31. The disk drive assembly of claim 3 wherein the read channel includes means for activating and deactivating each MR head transducers in response to the controller, whereby the controller iterates sequencing between the first and second MR heads of at least one media disk during idle mode.

32. The disk drive assembly of claim 1 wherein the controller controls current flow to the MR head transducer to reduce power consumption during idle mode.

33. The disk drive assembly of claim 1 wherein the controller controls current flow to the MR head transducer during idle mode to increase MR head transducer longevity.

34. The disk assembly of claim 1 wherein during idle mode the controller: (i) activates the MR head transducer for accessing data in servo information locations, and (ii) deactivates the MR head transducer substantially over data storage locations.

* * * * *